United States Patent
Akkarakaran et al.

(10) Patent No.: US 11,737,037 B2
(45) Date of Patent: Aug. 22, 2023

(54) SIDELINK TRACKING CONSIDERATIONS WITH MULTI-PANEL OPERATION

(71) Applicant: QUALCOMM Incorporated, San Diego, CA (US)

(72) Inventors: Sony Akkarakaran, Poway, CA (US); Ling Ding, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 17/103,478

(22) Filed: Nov. 24, 2020

(65) Prior Publication Data

US 2021/0160804 A1    May 27, 2021

Related U.S. Application Data

(60) Provisional application No. 62/941,695, filed on Nov. 27, 2019.

(51) Int. Cl.
*H04W 56/00* (2009.01)
*H04W 72/21* (2023.01)
*H04W 72/51* (2023.01)

(52) U.S. Cl.
CPC ....... *H04W 56/0035* (2013.01); *H04W 72/21* (2023.01); *H04W 72/51* (2023.01)

(58) Field of Classification Search
CPC ......... H04W 56/0035; H04W 72/0413; H04W 72/048

See application file for complete search history.

(56) References Cited

U.S. PATENT DOCUMENTS

| 2020/0052843 A1* | 2/2020 | Cheng | H04L 5/0051 |
| 2020/0351136 A1* | 11/2020 | Hwang | H04L 27/261 |
| 2021/0099265 A1* | 4/2021 | Shin | H04L 5/0051 |

(Continued)

FOREIGN PATENT DOCUMENTS

| WO | WO-2019036578 A1 | 2/2019 |
| WO | WO-2019099535 A1 | 5/2019 |

OTHER PUBLICATIONS

R1-1717306 Huawei "Further details of PTRS" 3GPP WG1 #90bis Prague Oct. 9-13, 2017 (Year: 2017).*

(Continued)

*Primary Examiner* — Basil Ma
(74) *Attorney, Agent, or Firm* — Holland & Hart LLP

(57) ABSTRACT

Methods, systems, and devices for wireless communications are described. A first user equipment (UE) may transmit a capability message indicating a parameter configuration for each phase error process of a set of phase error processes of the first UE. The first UE may transmit, to a second UE, a phase error process indicator to indicate that the first UE is using a first phase error process of the set of phase error processes to generate a sidelink transmission in accordance with the parameter configuration for the first phase error process. The second UE may monitor, via a sidelink channel, for the sidelink transmission based on frequency tracking, phase tracking, time tracking, or any combination thereof being performed in accordance with the parameter configuration for the first phase error process. The first UE may transmit, via the sidelink channel, the sidelink transmission to the second UE.

30 Claims, 12 Drawing Sheets

(56) References Cited

U.S. PATENT DOCUMENTS

| | | | |
|---|---|---|---|
| 2021/0105787 A1* | 4/2021 | Park | H04W 72/085 |
| 2022/0039080 A1* | 2/2022 | Khoryaev | H04W 4/40 |
| 2022/0070855 A1* | 3/2022 | Zhang | H04W 72/042 |
| 2022/0174655 A1* | 6/2022 | Tsai | H04W 48/16 |

OTHER PUBLICATIONS

International Search Report and Written Opinion—PCT/US2020/062335—ISA/EPO—dated Feb. 23, 2021.

* cited by examiner

SIDELINK TRACKING CONSIDERATIONS WITH MULTI-PANEL OPERATION

CROSS REFERENCE

The present application for patent claims the benefit of U.S. Provisional Patent Application No. 62/941,695 by AKKARAKARAN et al., entitled "SIDELINK TRACKING CONSIDERATIONS WITH MULTI-PANEL OPERATION," filed Nov. 27, 2019, assigned to the assignee hereof, and expressly incorporated by reference herein.

FIELD OF TECHNOLOGY

The following relates generally to wireless communications and more specifically to sidelink tracking considerations with multi-panel operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may perform communications with another UE, which may be referred to as sidelink communications. For instance, a first UE may transmit a signal to a second UE. The second UE may perform a variety of operations to receive and successfully decode the signal. For instance, the second UE may convert the received signal from a radio frequency (RF) signal to a baseband signal.

SUMMARY

The described techniques relate to improved methods, systems, devices, and apparatuses that support sidelink tracking considerations with multi-panel operation. Generally, the described techniques provide for a first user equipment (UE) to transmit a capability message indicating a parameter configuration for each phase error process of a set of phase error processes of the first UE. The first UE may transmit, to a second UE, a phase error process indicator to indicate that the first UE is using a first phase error process of the set of phase error processes to generate a sidelink transmission in accordance with the parameter configuration for the first phase error process. The second UE may monitor, via a sidelink channel, for the sidelink transmission based on frequency tracking, phase tracking, time tracking, or any combination thereof being performed in accordance with the parameter configuration for the first phase error process. The first UE may transmit, via the sidelink channel, the sidelink transmission to the second UE. By monitoring according to the first phase error process, the second UE may account for a frequency drift, a phase noise, a timing error, or any combination of these associated with the first phase error process and may enable the second UE to more accurately receive and decode the sidelink transmission.

A method for wireless communications by a first UE is described. The method may include transmitting a capability message indicating a parameter configuration for each phase error process of a set of phase error processes of the first UE, transmitting a phase error process indicator to indicate that the first UE is using a first phase error process of the set of phase error processes to generate a sidelink transmission in accordance with the parameter configuration for the first phase error process, and transmitting, via a sidelink channel, the sidelink transmission to a second UE.

An apparatus for wireless communications by a first UE is described. The apparatus may include a processor, memory in electronic communication with the processor, and instructions stored in the memory. The instructions may be executable by the processor to cause the apparatus to transmit a capability message indicating a parameter configuration for each phase error process of a set of phase error processes of the first UE, transmit a phase error process indicator to indicate that the first UE is using a first phase error process of the set of phase error processes to generate a sidelink transmission in accordance with the parameter configuration for the first phase error process, and transmit, via a sidelink channel, the sidelink transmission to a second UE.

Another apparatus for wireless communications by a first UE is described. The apparatus may include means for transmitting a capability message indicating a parameter configuration for each phase error process of a set of phase error processes of the first UE, means for transmitting a phase error process indicator to indicate that the first UE is using a first phase error process of the set of phase error processes to generate a sidelink transmission in accordance with the parameter configuration for the first phase error process, and means for transmitting, via a sidelink channel, the sidelink transmission to a second UE.

A non-transitory computer-readable medium storing code for wireless communications by a first UE is described. The code may include instructions executable by a processor to transmit a capability message indicating a parameter configuration for each phase error process of a set of phase error processes of the first UE, transmit a phase error process indicator to indicate that the first UE is using a first phase error process of the set of phase error processes to generate a sidelink transmission in accordance with the parameter configuration for the first phase error process, and transmit, via a sidelink channel, the sidelink transmission to a second UE.

In some examples of the method, apparatuses, and non-transitory computer-readable medium described herein, transmitting the capability message may include operations, features, means, or instructions for transmitting the capability message indicating the parameter configuration for the first phase error process that indicates a sidelink frequency offset parameter, a sidelink timing error parameter, a sidelink phase noise process parameter, a sidelink phase noise characteristic, or any combination thereof.

In some examples of the method, apparatuses, and non-transitory computer-readable medium described herein, transmitting the capability message may include operations, features, means, or instructions for transmitting the capability message to the second UE via the sidelink channel.

In some examples of the method, apparatuses, and non-transitory computer-readable medium described herein, transmitting the capability message may include operations, features, means, or instructions for transmitting the capability message to a base station or a sidelink coordination function.

In some examples of the method, apparatuses, and non-transitory computer-readable medium described herein, the sidelink coordination function includes a proximity services function.

In some examples of the method, apparatuses, and non-transitory computer-readable medium described herein, transmitting the capability message may include operations, features, means, or instructions for transmitting the capability message indicating the parameter configuration for the first phase error process that indicates a transmission time interval in which the first phase error process may apply.

In some examples of the method, apparatuses, and non-transitory computer-readable medium described herein, transmitting the capability message may include operations, features, means, or instructions for transmitting the capability message indicating the parameter configuration for the first phase error process that indicates the sidelink transmission may be a reference signal transmission.

In some examples of the method, apparatuses, and non-transitory computer-readable medium described herein, the reference signal transmission corresponds to a sidelink synchronization signal block, a physical sidelink control channel, a physical sidelink data channel, a sidelink channel state information reference signal, a sidelink sounding reference signal, a synchronization signal block, a physical uplink control channel, physical uplink data channel, or any combination thereof.

In some examples of the method, apparatuses, and non-transitory computer-readable medium described herein, transmitting the capability message may include operations, features, means, or instructions for transmitting the capability message indicating the parameter configuration for the first phase error process that indicates one or more panels of the first UE for which the first phase error process may be in use.

In some examples of the method, apparatuses, and non-transitory computer-readable medium described herein, transmitting the capability message may include operations, features, means, or instructions for transmitting the capability message indicating the parameter configuration for the first phase error process that indicates one or more transmission reception points, panels, or both, for which the first phase error process may be in use.

In some examples of the method, apparatuses, and non-transitory computer-readable medium described herein, transmitting the capability message may include operations, features, means, or instructions for transmitting the capability message indicating the parameter configuration for the first phase error process that indicates a quasi co-location relationship with respect to doppler shift, phase noise, timing offset, or any combination thereof, between the first phase error process and a second phase error process of the set of phase error processes.

In some examples of the method, apparatuses, and non-transitory computer-readable medium described herein, transmitting the capability message may include operations, features, means, or instructions for transmitting the capability message indicating the parameter configuration for the first phase error process that indicates a location of one or more panels of the first UE for which the first phase error process may be in use.

In some examples of the method, apparatuses, and non-transitory computer-readable medium described herein, transmitting the capability message may include operations, features, means, or instructions for transmitting the capability message indicating the parameter configuration for the first phase error process that indicates a capability of the first UE, when the first phase error process is in use, to simultaneously transmit and receive from one or more wireless devices.

In some examples of the method, apparatuses, and non-transitory computer-readable medium described herein, transmitting the phase error process indicator may include operations, features, means, or instructions for transmitting the phase error process indicator indicating a transmission time interval in which the first phase error process may apply.

In some examples of the method, apparatuses, and non-transitory computer-readable medium described herein, transmitting the phase error process indicator may include operations, features, means, or instructions for transmitting the phase error process indicator indicating the sidelink transmission may be a reference signal transmission.

In some examples of the method, apparatuses, and non-transitory computer-readable medium described herein, the reference signal transmission corresponds to a sidelink synchronization signal block, a physical sidelink control channel, a physical sidelink data channel, a sidelink channel state information reference signal, a sidelink sounding reference signal, a synchronization signal block, a physical uplink control channel, physical uplink data channel, or any combination thereof.

In some examples of the method, apparatuses, and non-transitory computer-readable medium described herein, transmitting the phase error process indicator may include operations, features, means, or instructions for transmitting the phase error process indicator indicating one or more panels of the first UE for which the first phase error process may be in use.

In some examples of the method, apparatuses, and non-transitory computer-readable medium described herein, transmitting the phase error process indicator may include operations, features, means, or instructions for transmitting the phase error process indicator indicating one or more transmission reception points, panels, or both for which the first phase error process may be in use.

In some examples of the method, apparatuses, and non-transitory computer-readable medium described herein, transmitting the phase error process indicator may include operations, features, means, or instructions for transmitting the phase error process indicator indicating a quasi co-location relationship with respect to doppler shift, phase noise, timing offset, or any combination thereof, between the first phase error process and a second phase error process of the set of phase error processes.

In some examples of the method, apparatuses, and non-transitory computer-readable medium described herein, transmitting the phase error process indicator may include operations, features, means, or instructions for transmitting the phase error process indicator indicating a location of one or more panels of the first UE for which the first phase error process may be in use.

In some examples of the method, apparatuses, and non-transitory computer-readable medium described herein, transmitting the phase error process indicator may include operations, features, means, or instructions for transmitting the phase error process indicator indicating a capability of the first UE, when the first phase error process is in use, to simultaneously transmit and receive from one or more wireless devices.

In some examples of the method, apparatuses, and non-transitory computer-readable medium described herein, the capability message indicates that the first UE may be capable of transmitting one or more signals associated with the set of phase error processes.

In some examples of the method, apparatuses, and non-transitory computer-readable medium described herein, the capability message may be a radio resource control message, a medium access control (MAC) control element, sidelink control information, a sidelink control channel message, a sidelink shared channel message, an uplink control channel message, an uplink shared channel message, or any combination thereof.

In some examples of the method, apparatuses, and non-transitory computer-readable medium described herein, each of the set of phase error processes corresponds to a respective voltage controlled oscillator of a set of voltage controlled oscillators of the first UE.

A method for wireless communications by a first UE is described. The method may include receiving a capability message indicating a parameter configuration for each phase error process of a set of phase error processes of a second UE, receiving a phase error process indicator to indicate that the second UE is using a first phase error process of the set of phase error processes to generate a sidelink transmission in accordance with the parameter configuration for the first phase error process, and monitoring, via a sidelink channel, for the sidelink transmission based on frequency tracking, phase tracking, time tracking, or any combination thereof, being performed in accordance with the parameter configuration for the first phase error process.

An apparatus for wireless communications by a first UE is described. The apparatus may include a processor, memory in electronic communication with the processor, and instructions stored in the memory. The instructions may be executable by the processor to cause the apparatus to receive a capability message indicating a parameter configuration for each phase error process of a set of phase error processes of a second UE, receive a phase error process indicator to indicate that the second UE is using a first phase error process of the set of phase error processes to generate a sidelink transmission in accordance with the parameter configuration for the first phase error process, and monitor, via a sidelink channel, for the sidelink transmission based on frequency tracking, phase tracking, time tracking, or any combination thereof, being performed in accordance with the parameter configuration for the first phase error process.

Another apparatus for wireless communications by a first UE is described. The apparatus may include means for receiving a capability message indicating a parameter configuration for each phase error process of a set of phase error processes of a second UE, means for receiving a phase error process indicator to indicate that the second UE is using a first phase error process of the set of phase error processes to generate a sidelink transmission in accordance with the parameter configuration for the first phase error process, and means for monitoring, via a sidelink channel, for the sidelink transmission based on frequency tracking, phase tracking, time tracking, or any combination thereof, being performed in accordance with the parameter configuration for the first phase error process.

A non-transitory computer-readable medium storing code for wireless communications by a first UE is described. The code may include instructions executable by a processor to receive a capability message indicating a parameter configuration for each phase error process of a set of phase error processes of a second UE, receive a phase error process indicator to indicate that the second UE is using a first phase error process of the set of phase error processes to generate a sidelink transmission in accordance with the parameter configuration for the first phase error process, and monitor, via a sidelink channel, for the sidelink transmission based on frequency tracking, phase tracking, time tracking, or any combination thereof, being performed in accordance with the parameter configuration for the first phase error process.

Some examples of the method, apparatuses, and non-transitory computer-readable medium described herein may further include operations, features, means, or instructions for receiving the sidelink transmission based on of the monitoring.

In some examples of the method, apparatuses, and non-transitory computer-readable medium described herein, receiving the capability message may include operations, features, means, or instructions for receiving the capability message indicating the parameter configuration for the first phase error process that indicates a sidelink frequency offset parameter, a sidelink timing error parameter, a sidelink phase noise process parameter, a sidelink phase noise characteristic, or any combination thereof.

In some examples of the method, apparatuses, and non-transitory computer-readable medium described herein, receiving the capability message may include operations, features, means, or instructions for receiving the capability message from the second UE via the sidelink channel.

In some examples of the method, apparatuses, and non-transitory computer-readable medium described herein, receiving the capability message may include operations, features, means, or instructions for receiving the capability message from a base station or a sidelink coordination function.

In some examples of the method, apparatuses, and non-transitory computer-readable medium described herein, the sidelink coordination function includes a proximity services function.

In some examples of the method, apparatuses, and non-transitory computer-readable medium described herein, receiving the capability message may include operations, features, means, or instructions for receiving the capability message indicating the parameter configuration for the first phase error process that indicates a transmission time interval in which the first phase error process may be apply.

In some examples of the method, apparatuses, and non-transitory computer-readable medium described herein, receiving the capability message may include operations, features, means, or instructions for receiving the capability message indicating the parameter configuration for the first phase error process that indicates that the sidelink transmission may be a reference signal transmission.

In some examples of the method, apparatuses, and non-transitory computer-readable medium described herein, the reference signal transmission corresponds to a sidelink synchronization signal block, a physical sidelink control channel, a physical sidelink data channel, a sidelink channel state information reference signal, a sidelink sounding reference signal, a synchronization signal block, a physical uplink control channel, physical uplink data channel, or any combination thereof.

In some examples of the method, apparatuses, and non-transitory computer-readable medium described herein, receiving the capability message may include operations, features, means, or instructions for receiving the capability message indicating the parameter configuration for the first phase error process that indicates one or more panels of the second UE for which the first phase error process may be in use.

In some examples of the method, apparatuses, and non-transitory computer-readable medium described herein, receiving the capability message may include operations, features, means, or instructions for receiving the capability message indicating the parameter configuration for the first phase error process that indicates one or more transmission reception points, panels, or both for which the first phase error process may be in use.

In some examples of the method, apparatuses, and non-transitory computer-readable medium described herein, receiving the capability message may include operations, features, means, or instructions for receiving the capability message indicating the parameter configuration for the first phase error process that indicates a quasi co-location relationship with respect to doppler shift, phase offset, timing offset, or any combination thereof, between the first phase error process and a second phase error process of the set of phase error processes.

Some examples of the method, apparatuses, and non-transitory computer-readable medium described herein may further include operations, features, means, or instructions for monitoring for a second sidelink transmission based on frequency tracking, phase tracking, time tracking, or any combination thereof, being performed in accordance with the quasi co-location relationship.

In some examples of the method, apparatuses, and non-transitory computer-readable medium described herein, receiving the capability message may include operations, features, means, or instructions for receiving the capability message indicating the parameter configuration for the first phase error process that indicates a location of one or more panels of the second UE for which the first phase error process may be in use.

In some examples of the method, apparatuses, and non-transitory computer-readable medium described herein, receiving the capability message may include operations, features, means, or instructions for receiving the capability message indicating the parameter configuration for the first phase error process that indicates a capability of the second UE, when the first phase error process is in use, to simultaneously transmit and receive from one or more wireless devices.

In some examples of the method, apparatuses, and non-transitory computer-readable medium described herein, receiving the phase error process indicator may include operations, features, means, or instructions for receiving the phase error process indicator indicating a transmission time interval in which the first phase error process may apply.

In some examples of the method, apparatuses, and non-transitory computer-readable medium described herein, receiving the phase error process indicator may include operations, features, means, or instructions for receiving the phase error process indicator indicating the sidelink transmission may be a reference signal transmission.

In some examples of the method, apparatuses, and non-transitory computer-readable medium described herein, the reference signal transmission corresponds to a sidelink synchronization signal block, a physical sidelink control channel, a physical sidelink data channel, a sidelink channel state information reference signal, a sidelink sounding reference signal, a synchronization signal block, a physical uplink control channel, physical uplink data channel, or any combination thereof.

In some examples of the method, apparatuses, and non-transitory computer-readable medium described herein, receiving the phase error process indicator may include operations, features, means, or instructions for receiving the phase error process indicator indicating one or more panels of the first UE for which the first phase error process may be in use.

In some examples of the method, apparatuses, and non-transitory computer-readable medium described herein, receiving the phase error process indicator may include operations, features, means, or instructions for receiving the phase error process indicator indicating one or more transmission reception points, panels, or both for which the first phase error process may be in use.

In some examples of the method, apparatuses, and non-transitory computer-readable medium described herein, receiving the phase error process indicator may include operations, features, means, or instructions for receiving the phase error process indicator indicating a quasi co-location relationship with respect to doppler shift, phase noise, timing offset, or any combination thereof, between the first phase error process and a second phase error process of the set of phase error processes.

In some examples of the method, apparatuses, and non-transitory computer-readable medium described herein, receiving the phase error process indicator may include operations, features, means, or instructions for receiving the phase error process indicator indicating a location of one or more panels of the first UE for which the first phase error process may be in use.

In some examples of the method, apparatuses, and non-transitory computer-readable medium described herein, receiving the phase error process indicator may include operations, features, means, or instructions for receiving the phase error process indicating a capability of the first UE, when the first phase error process is in use, to simultaneously transmit and receive from one or more wireless devices.

In some examples of the method, apparatuses, and non-transitory computer-readable medium described herein, the capability message indicates that the second UE may be capable of transmitting one or more signals associated with the set of phase error processes.

In some examples of the method, apparatuses, and non-transitory computer-readable medium described herein, the capability message may be a radio resource control message, a MAC control element, sidelink control information, a sidelink control channel message, a sidelink shared channel message, an uplink control channel message, an uplink shared channel message, or any combination thereof.

In some examples of the method, apparatuses, and non-transitory computer-readable medium described herein, each of the set of phase error processes corresponds to respective voltage controlled oscillator of a set of voltage controlled oscillators of the second UE.

DETAILED DESCRIPTION

Figure 1:
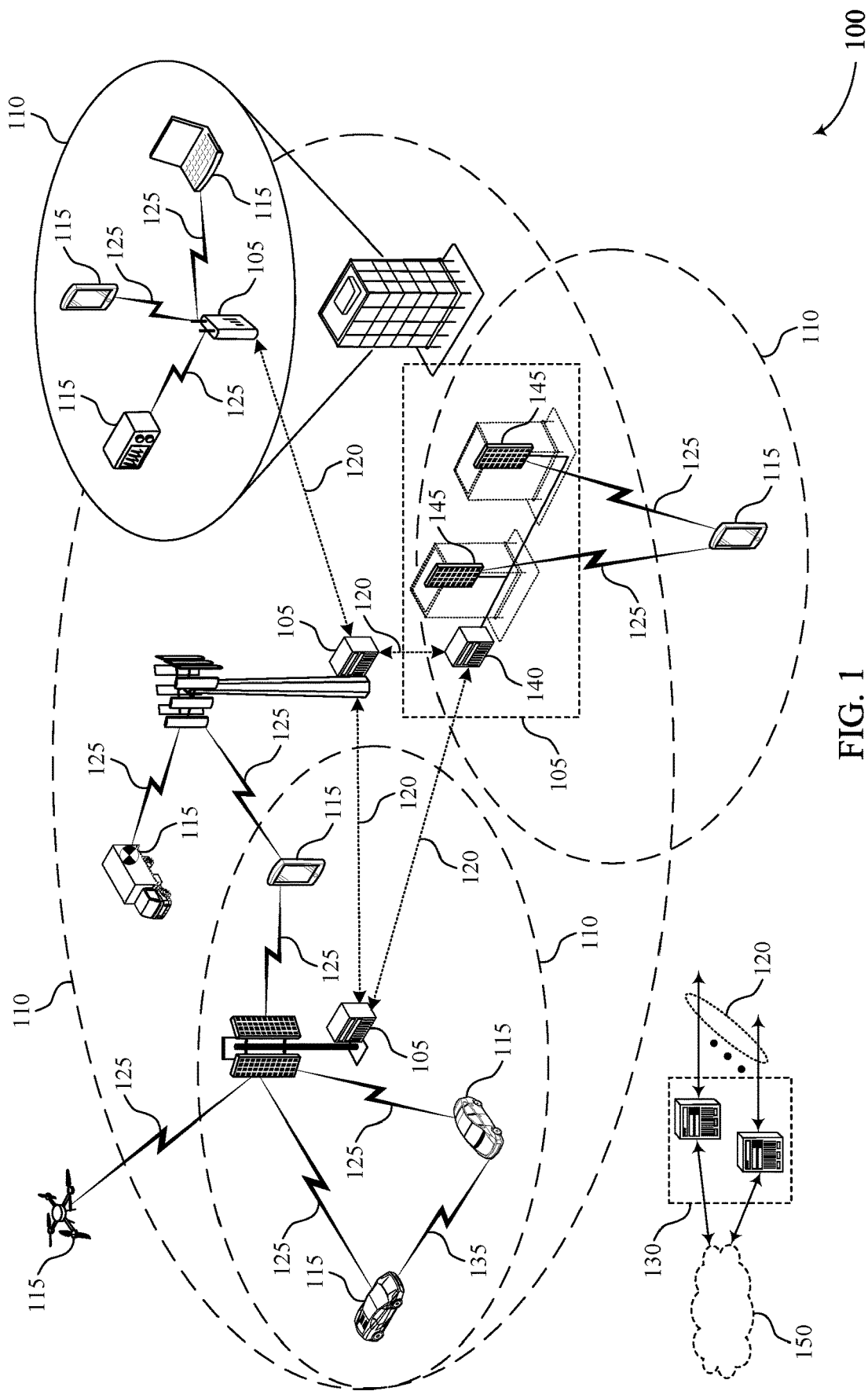
FIG. 1 illustrates an example of a wireless communications system that supports sidelink tracking considerations with multi-panel operation in accordance with aspects of the present disclosure.

User equipment (UE) may perform frequency tracking to assist in interconverting a signal received from a base station from radio frequency (RF) to baseband. In some examples, a UE may determine that a frequency drift associated with the transmitting base station varies in a relatively insignificant fashion (e.g., below a threshold amount) as compared to a frequency drift associated with a panel of the receiving UE. As such, when performing frequency tracking, the UE may perform the frequency tracking under the assumption that there is no frequency drift associated with the transmitting base station. However, when performing communications with another UE (i.e., sidelink communications), the frequency drift associated with a panel for a transmitting UE may vary in a significant enough fashion (e.g., above a threshold amount) as compared to a frequency drift associated with a panel for a receiving UE such that the receiving UE may fail to accurately perform RF to baseband conversion if assuming that frequency drift associated with the panel for the transmitting UE is approximately 0. Similar issues may occur when a UE performs time tracking or phase tracking with another UE.

In some cases, a receiving UE and a transmitting UE may have multiple panels for performing sidelink communications. Some of these multiple panels may have the same phase error processes (e.g., frequency drift offsets, timing errors, phase noise processes, and phase noise characteristics), but others may have phase error processes that are somewhat correlated or completely independent of each other. In some cases, panels that share a common voltage controlled oscillator (VCO) may have same or somewhat correlated phase error processes and those that have different VCOs may have phase error processes that are completely or mostly independent of each other. As such, multiple phase error processes may be associated with performing multi-panel sidelink communications.

To enable sidelink frequency tracking for multiple phase error processes, a first UE may transmit a capability message indicating a parameter configuration for each phase error process of a set of phase error processes of the first UE. The first UE may transmit a phase error process indicator to indicate that the first UE is using a first phase error process of the set of phase error processes to generate a sidelink transmission in accordance with the parameter configuration for the first phase error process. A second UE may receive the phase error process indicator and may monitor, via a sidelink channel, for the sidelink transmission based on frequency tracking, phase tracking, time tracking, or any combination thereof being performed in accordance with the parameter configuration for the first phase error process. The first UE may transmit, via the sidelink channel, the sidelink transmission to the second UE. By monitoring according to the first phase error process, the second UE may account for a frequency drift, a phase noise, a timing error, or any combination of these associated with the first phase error process and may enable the second UE to more accurately receive and decode the sidelink transmission. For instance, the second UE may be more accurately able to interconvert a signal received from the first UE from radio frequency (RF) to baseband.

Aspects of the disclosure are initially described in the context of wireless communications systems. Additional aspects of the disclosure are described in the context of an additional wireless communications system and a process flow. Aspects of the disclosure are further illustrated by and described with reference to apparatus diagrams, system diagrams, and flowcharts that relate to sidelink tracking considerations with multi-panel operation.

FIG. 1 illustrates an example of a wireless communications system 100 that supports sidelink tracking considerations with multi-panel operation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, a first UE 115 may transmit a capability message (e.g., to a base station 105 or another UE 115) indicating a parameter configuration for each phase error process of a set of phase error processes of the first UE 115. The first UE 115 may transmit, to a second UE 115, a phase error process indicator to indicate that the first UE 115 is using a first phase error process of the set of phase error processes to generate a sidelink transmission in accordance with the parameter configuration for the first phase error process. The second UE 115 may monitor, via a sidelink channel, for the sidelink transmission based on frequency tracking, phase tracking, time tracking, or any combination thereof being performed in accordance with the parameter configuration for the first phase error process. The first UE 115 may transmit, via the sidelink channel, the sidelink transmission to the second UE 115. By monitoring according to the first phase error process, the second UE 115 may account for a frequency drift, a phase noise, a timing error, or any combination of these associated with the first phase error process and may enable the second UE 115 to more accurately receive and decode the sidelink transmission.

Figure 2:
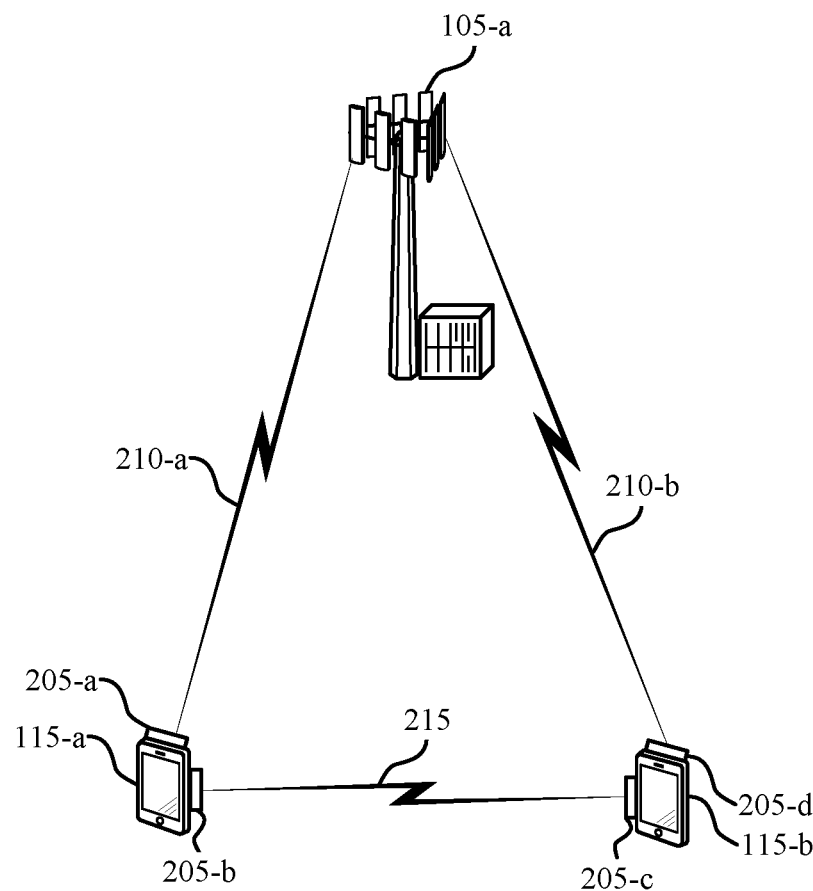
FIG. 2 illustrates an example of a wireless communications system that supports sidelink tracking considerations with multi-panel operation in accordance with aspects of the present disclosure.

FIG. 2 illustrates an example of a wireless communications system 200 that supports sidelink tracking considerations with multi-panel operation in accordance with aspects of the present disclosure. In some examples, wireless communications system 200 may implement aspects of wireless communications system 100. For instance, UEs 115-a and 115-b may be examples of UEs 115 as described with reference to FIG. 1 and base station 105-a may be an example of a base station 105 as described with reference to FIG. 1. UE 115-a may communicate using panels 205-a and 205-b and UE 115-b may communicate using panels 205-c and 205-d.

In some cases, UEs 115-a and/or 115-b may perform frequency tracking, phase tracking, time tracking, or a combination thereof with multi-panel operation. If panels 205-a and 205-b of UE 115-a share a same oscillator (e.g., a same VCO) for performing RF-to-baseband interconversion, panels 205-a and 205-b may use the same tracking for both panels. However, if panels 205-a and 205-b do not share the same oscillator (e.g., have different oscillators and/or separate VCOs), panels 205-a and 205-b may use separate tracking.

Each VCO may be associated with a respective phase error process. For instance, each VCO may experience different degrees of frequency drift, timing errors, and phase noise. As such, each VCO may be associated with one or more of a frequency offset parameter, a timing error parameter, a phase noise process parameter, or phase noise characteristics parameter (e.g., phase noise variance, power, or power spectrum) independent from or at least partially correlated to that of other VCOs.

UEs 115-a and 115-b may perform frequency tracking on a Uu link 210 (e.g., a radio interface between Universal Mobile Telecommunications Service (UMTS) Terrestrial Radio Access Network (UTRAN) and a UE 115) or sidelink 215 (e.g., between panels 205-b and 205-c). For instance, UE 115-a may perform frequency tracking over Uu link 210-a and UE 115-b may perform frequency tracking over Uu link 210-b. When UEs 115-a and/or 115-perform frequency tracking on a Uu link 210, the frequency drift of the VCOs of UEs 115-a and 115-b may dominate error vector magnitude (EVM) as compared to that of a VCO of base station 105-a, as the VCO of base station 105-a may be more accurate than VCOs of UEs 115-a and/or 115-b. As such, frequency tracking on a Uu link 210 may be performed under the assumption that the VCO of base station 105-a has no errors. For downlink, UEs 115-a and/or 115-b may choose to track each of their VCO errors separately, or may track one of them and derive or otherwise assume the tracking result for the others based on the tracked one of the errors. Additionally, for downlink, base station 105-a may be agnostic to or may otherwise not identify the number of receive panels 205 that a UE 115 receiving the downlink transmission has. For uplink, base station 105-a may not frequency track the uplink of the UE 115 transmitting the uplink transmission, as the drift displayed by a VCO may be low enough that base station 105-a may receive and/or successfully decode the transmission without accounting for frequency drift. Thus, for UEs 115 with multiple VCOs, base station 105-*a* may not determine which UE transmission (e.g., which uplink transmission) used which VCO. In some cases, on uplink, a UE 115 may transmit a uplink phase-tracking reference signal (PTRS) to track a phase noise of the UE 115. Each panel 205 may be allocated its own PTRS resource so that base station 105-*a* may track the phase noises or drift separately.

When performing frequency tracking on sidelink 215, the two ends of the sidelink 215 may be UEs 115-*a* and 115-*b*, whose frequency drifts may be large enough relative to each other that neither UE 115 may assume, with accuracy, that the VCO of the other UE 115 has no errors. For instance, if UE 115-*a* and/or UE 115-*b* assume that the VCO of the other UE 115 has no errors, UE 115-*a* and/or UE 115-*b* may fail to receive and/or successfully decode a transmission from UE 115-*b* and/or UE 115-*a*, respectively. The methods as described herein may correspond to sidelink design features to account for this difference.

As noted herein, different panels 205 may have a same oscillator or different oscillators for RF-to-baseband conversion. A transmit panel 205 versus a receive panel 205 (e.g., when the UE 115 is operating in an FDD mode) and/or a panel 205 operating in a transmit mode versus the same panel 205 operating in a receive mode may use different VCOs or may have VCOs derived from each other by a common clock. If a first panel 205 (e.g., 205-*a*) and a second panel 205 (e.g., 205-*b*) use different VCOs, the different VCOs may have different frequency errors or drifts. Such frequency errors or drifts may be totally independent or may have some degree of correlation. For instance, correlation may be based on or occur due at least in part to temperature or VCO signals being derived from a common clock. Additionally or alternatively, correlation may depend at least in part on where the panels 205 are mounted (e.g., on a car, on the same board or on opposite sides or bumpers, which may, in some instances, be at different temperatures). Similarly, different VCOs may have different phase noise characteristics and independent phase noise processes. In some cases, the phase noise characteristics and/or processes may be at least somewhat correlated.

To perform sidelink frequency tracking, each UE 115 may track based on its Uu link 210. For instance, UE 115-*a* may perform sidelink frequency tracking based on Uu link 210-*a* and UE 115-*b* may perform sidelink frequency tracking based on Uu link 210-*b*. In such cases, UEs 115-*a* and 115-*b* may not perform separate sidelink tracking (e.g., the UEs 115 may not rely on sidelink 215). In some cases, performing frequency tracking based on respective Uu links 210 may be done if one or both of UEs 115-*a* and 115-*b* are in-coverage UEs 115 of base station 105-*a* (e.g., UEs 115 within a coverage area of base station 105-*a*).

However, in some cases, the UEs 115 and/or base station 105-*a* may be moving relative to each other. Such movement may be associated with a doppler-shift that manifests as a frequency error and is tracked by the frequency tracking loop of the UEs 115. In some cases, even if both UE 115-*a* and 115-*b* have Uu links 210 to the same base station 105-*a* (e.g., Uu link 210-*a* and Uu link 210-*b*), the sidelink doppler shift (e.g., the doppler shift that occurs when UEs 115 are moving relative to each other) may be different from either of the Uu link dopplers (e.g., the doppler shift that occurs when a UE 115 is moving relative to base station 105-*a*). Such a difference may occur depending on the motion directions or headings of the UEs 115 relative to each other and base station 105-*a*.

A method of sidelink frequency tracking that may account for sidelink doppler shift may involve a receiving UE 115 (e.g., UE 115-*a*) performing frequency tracking based on a received signal from a transmit UE 115 (e.g., UE 115-*b*). For instance, the receive UE 115 may be informed of which transmit signals of the transmit UE 115 are used by the same VCO or have the same phase error process and may track each transmit VCO or phase error process separately. For instance, the receive UE 115 may receive control signaling (e.g., sidelink radio resource control (RRC), medium access control (MAC) control element (MAC-CE), downlink control information (DCI)) from the transmit UE 115 or from base station 105-*a* that informs the receive UE 115 of which transmit signals use the same VCO or have the same phase error process. The control signaling may also indicate a maximum and/or expected amount or range of errors across the VCOs or phase error processes. In some cases, the transmit UE 115 may track some or each receive VCO or phase error process of the receive UE 115.

In some cases, a VCO or phase error process in use may be on a per time-unit basis (e.g., per OFDM symbol, slot or frame). Additionally or alternatively, a VCO or phase error process being used may be on a per reference signal basis. For instance, synchronization signal block (SSB) and physical downlink control channel (PDCCH) may have a first associated VCO or phase error process, and physical downlink shared channel (PDSCH) may have a second associated VCO or phase error process. Each reference signal may correspond to a sidelink SSB, a sidelink channel state information reference signal (CSI-RS), a sidelink sounding reference signal (SRS), a SSB, a PDCCH, a PDSCH, a physical sidelink shared channel (PSSCH), a physical sidelink control channel (PSCCH), a physical uplink control channel (PUCCH), or a physical uplink shared channel (PUSCH). In some cases, a VCO or phase error process in use may be on a per resource basis (e.g., per SSB-index, per control resource set (CORESET) or search space, or per CSI-RS or SRS resource). Additionally or alternatively, a VCO or phase error process in use may be on a per panel 205 or per transmission/reception point (TRP) basis and may have separate indications for which signals come from which panels 205 or which TRPs. In some cases, a VCO or phase error process in use may be implicitly indicated via existing quasi co-location (QCL) types (e.g., QCL types A, B, C, or D) or explicitly indicated via a new QCL type (e.g., QCL with respect to doppler shift and/or with respective to phase nose). When receiving the indication, the receive UE 115, in some examples, may not identify details of the transmit VCO architecture. Instead, the receive UE 115 may determine which signals may be assumed to have a same frequency offset, or a same phase noise, or other characteristic of the phase error process. In some cases, the VCO or phase error process in use may be based on any combination of the bases described herein.

The methods as described herein may also apply to sidelink phase and/or time tracking. For instance, new QCL indications may be defined separately for phase tracking in a similar manner as described for frequency tracking herein or may be implicit from other QCL types (e.g., QCL types A, B, C, or D). Time-tracking reference signals (TRS) (e.g., where the TRS is a CSI-RS configured with 'trsInfo') may be used by defining a per-panel, per-VCO, or per-error-process TRS for sidelink.

In some cases, the capabilities or configuration of a UE 115 may be separate per panel. For instance, the panel location on the UE 115 or on a vehicle (e.g., a car), a capability of simultaneous transmission and reception, a capability to transmit and/or to receive from multiple nodes, a maximum transmit power or rated power class, or a combination thereof may vary on a per-panel basis. Additional examples of capabilities may include capabilities related to or corresponding to the number of VCOs or phase error processes used and parameters for each VCO. For instance, such capabilities may include phase noise power, power spectral density (PSD), expected frequency drift, or which panels use the same VCO or have the same phase error process. In some cases, a UE 115 may report at least one of the aforementioned capabilities to another UE 115 or to base station 105-*a*, as described in further detail with reference to FIG. 3.

In some examples, the receive UE 115 monitoring the sidelink transmission based on frequency tracking, phase tracking, time tracking, or any combination thereof, being performed in accordance with a received parameter configuration for a first phase error process may have one or more advantages. For instance, receiving the parameter configuration may enable the receive UE 115 to account for frequency drift, phase noise, or timing errors at a transmitting device when one or each of these quantities are non-zero. By accounting for one or each of these quantities according to the received parameter configuration, the receive UE 115 may be able to more accurately receive transmissions from the transmitting device.

Figure 3:
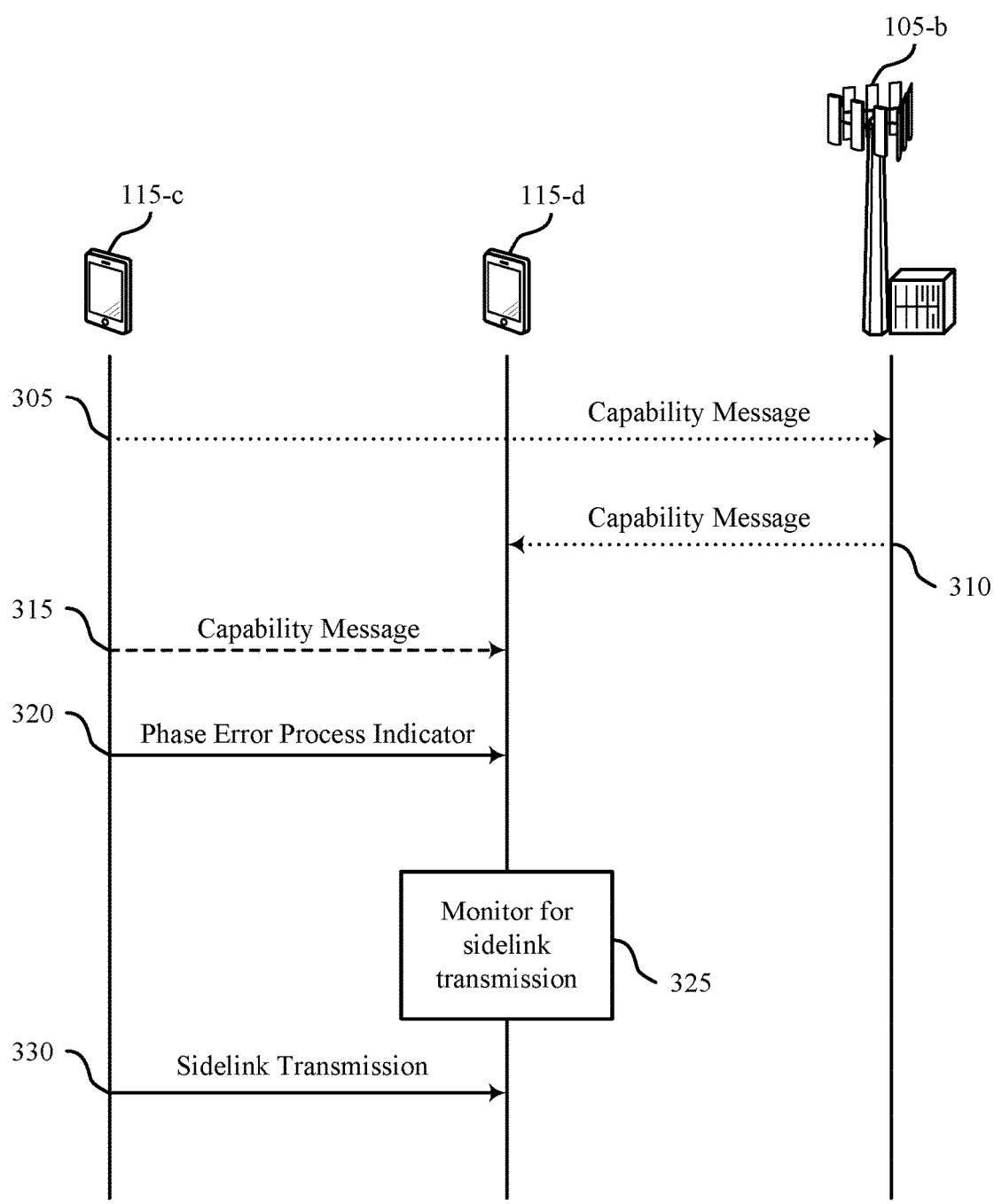
FIG. 3 illustrates an example of a process flow that supports sidelink tracking considerations with multi-panel operation in accordance with aspects of the present disclosure.

FIG. 3 illustrates an example of a process flow 300 that supports sidelink tracking considerations with multi-panel operation in accordance with aspects of the present disclosure. In some examples, process flow 300 may be implemented by aspects of wireless communications system 100. For instance, process flow 300 may be implemented by UEs 115-*c* and 115-*d*, which may be examples of UEs 115 as described with reference to FIG. 1, and base station 105-*b*, which may be an example of a base station 105 as described with reference to FIG. 1.

At 305, UE 115-*c* may transmit a capability message indicating a parameter configuration for each phase error process of a set of phase error processes of UE 115-*c*. Base station 105-*b* may receive the capability message. In some cases, UE 115-*c* may transmit the capability message to a sidelink coordination function, such as a proximity services (ProSe) function. A ProSe function may be a server or network node providing upper-layer functionality for sidelink support in a sidelink operation (e.g., an LTE sidelink operation). In some cases, UE 115-*c* may transmit the capability message to base station 105-*b*, which may send the capability message to the ProSe function. Base station 105-*b* may send the capability message to the ProSe function if it is unable to read the capability message.

At 310, base station 105-*b* may transmit the capability message or aspects of the capability message received at 305. UE 115-*d* may receive the capability message. In some examples, base station 105-*b* may relay the capability message to UE 115-*d* (e.g., via DCI, a PDCCH transmission, a PDSCH transmission).

At 315, UE 115-*c* may transmit a capability message via a sidelink channel indicating a parameter configuration for each phase error process of a set of phase error processes of UE 115-*c*. UE 115-*d* may receive the capability message. In some cases, one of 305 and 315, but not both, may occur. In such cases, if 315 occurs, 310 may not occur.

In some cases, the parameter configuration of the capability message (e.g., for either or both that of 305 and 310 or that of 315) may indicate a sidelink frequency offset parameter, a sidelink timing error parameter, a sidelink phase noise process parameter, a sidelink phase noise characteristic (e.g., a phase noise variance or power, or a power spectrum value), or any combination thereof. In some cases, the capability message may indicate that UE 115-*c* is capable of transmitting one or more signals associated with the set of phase error processes. The capability message may be a RRC message (e.g., a sidelink RRC message), a MAC-CE (e.g., a sidelink MAC-CE message), sidelink control information (SCI), a sidelink control channel message (e.g., a PSCCH transmission), a sidelink shared channel message (e.g., a PSSCH transmission), an uplink control channel message (e.g., a PUCCH transmission), an uplink shared channel message (e.g., a PUSCH transmission), or any combination thereof. Each of the set of phase error processes may correspond to a respective VCO of a set of VCOs of UE 115-*c*.

In some cases, the parameter configuration for the first phase error process may indicate a transmission time interval (e.g., OFDM symbol, slot or frame) in which the first phase error process applies. Additionally or alternatively, the parameter configuration for the first phase error process may indicate that the sidelink transmission is a reference signal transmission. The reference signal transmission may correspond to a sidelink SSB, a PSCCH, a PSSCH, a sidelink CSI-RS, a sidelink SRS, a PDCCH, a PDSCH, a PUCCH, a PUSCH, or a combination thereof. In some cases, the parameter configuration for the first phase error process may indicator one or more panels of UE 115-*c* for which the first phase error process is in use. Additionally or alternatively, the parameter configuration for the first phase error process may indicate one or more TRPs, panels, or both, for which the first phase error process is in use.

In some cases, the parameter configuration may indicate a QCL relationship with respect to doppler shift, phase noise, timing offset, or any combination thereof, between the first phase error process and a second phase error process of the set of phase error processes. Additionally or alternatively, the parameter configuration may indicate a location of one or more panels of UE 115-*c* for which the first phase error process is in use. In some cases, the parameter configuration for the first phase error process may indicate a capability of UE 115-*c*, with the first phase error process being in use, to simultaneously transmit and receive from one or more wireless devices.

At 320, UE 115-*c* may transmit a phase error process indicator to indicate that UE 115-*c* is using a first phase error process of the set of phase error processes to generate a sidelink transmission in accordance with the parameter configuration for the first phase error process. UE 115-*d* may receive the phase error process indicator.

In some cases, the phase error process indicator may indicate a transmission time interval (e.g., OFDM symbol, slot or frame) in which the first phase error process applies. Additionally or alternatively, the phase error process indicator may indicate the sidelink transmission is a reference signal transmission (e.g., a sidelink SSB, a PSCCH, a PSSCH, a sidelink CSI-RS, a sidelink SRS, a SSB, a PDCCH, a PDSCH, a PUCCH, a PUSCH). In some cases, the phase error process indicator may indicate one or more panels of UE 115-*c* for which the first phase error process is in use. Additionally or alternatively, the phase error process indicator may indicate one or more TRPs, panels, or both for which the first phase error process is in use.

In some cases, the phase error process indicator may indicate a QCL relationship with respect to doppler shift, phase noise, timing offset, or any combination thereof, between the first phase error process and a second phase error process of the set of phase error processes. Additionally or alternatively, the phase error process indicator may indicate a location of one or more panels of UE 115-*c* for which the first phase error process is in use. In some cases, the phase error process indicator may indicate a capability of UE 115-c, when the first phase error process is in use, to simultaneously transmit and receive from one or more wireless devices.

At 325, UE 115-d may monitor, via a sidelink channel (e.g., the sidelink channel as described with regards to 315), for the sidelink transmission based on frequency tracking, phase tracking, time tracking or any combination thereof, being performed in accordance with the parameter configuration for the first phase error process. In some cases (e.g., if receiving an indication of a QCL relationship via the phase error process indicator or the parameter configuration), UE 115-d may monitor for a second sidelink transmission based on frequency tracking, phase tracking, time tracking, or any combination thereof, being performed in accordance with the QCL relationship.

At 330, UE 115-c may transmit, via the sidelink channel, the sidelink transmission. UE 115-d may receive the sidelink transmission.

Figure 4:
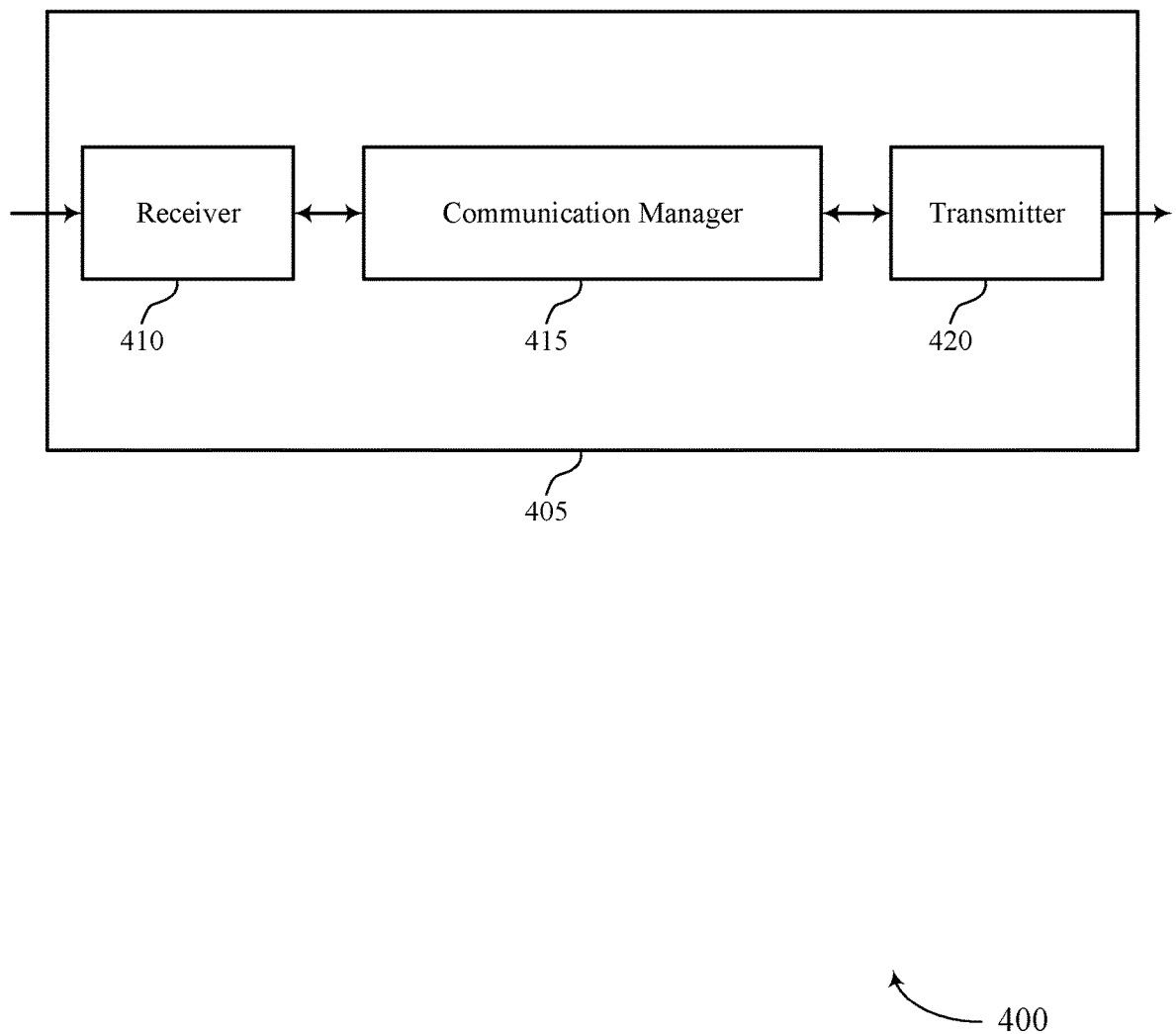
FIGS. 4 and 5 show block diagrams of devices that support sidelink tracking considerations with multi-panel operation in accordance with aspects of the present disclosure.

FIG. 4 shows a block diagram 400 of a device 405 that supports sidelink tracking considerations with multi-panel operation in accordance with aspects of the present disclosure. The device 405 may be an example of aspects of a UE 115 as described herein. The device 405 may include a receiver 410, a communication manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to sidelink tracking considerations with multi-panel operation, etc.). Information may be passed on to other components of the device 405. The receiver 410 may be an example of aspects of the transceiver 715 described with reference to FIG. 7. The receiver 410 may utilize a single antenna or a set of antennas.

The communication manager 415 may transmit a capability message indicating a parameter configuration for each phase error process of a set of phase error processes of the first UE, transmit a phase error process indicator to indicate that the first UE is using a first phase error process of the set of phase error processes to generate a sidelink transmission in accordance with the parameter configuration for the first phase error process, and transmit, via a sidelink channel, the sidelink transmission to a second UE. The communication manager 415 may also receive a capability message indicating a parameter configuration for each phase error process of a set of phase error processes of a second UE, receive a phase error process indicator to indicate that the second UE is using a first phase error process of the set of phase error processes to generate a sidelink transmission in accordance with the parameter configuration for the first phase error process, and monitor, via a sidelink channel, for the sidelink transmission based on frequency tracking, phase tracking, time tracking, or any combination thereof, being performed in accordance with the parameter configuration for the first phase error process. The communication manager 415 may be an example of aspects of the communication manager 710 described herein.

In some examples, the communication manager 415 monitoring the sidelink transmission based on frequency tracking, phase tracking, time tracking, or any combination thereof, being performed in accordance with a received parameter configuration for a first phase error process may have one or more advantages. For instance, receiving the parameter configuration may enable the communication manager 415 to account for frequency drift, phase noise, or timing errors at a transmitting device when one or each of these quantities are non-zero. By accounting for one or each of these quantities according to the received parameter configuration, the communication manager 415 may be able to more accurately receive transmissions from the transmitting device.

The communication manager 415, or its sub-components, may be implemented in hardware, code (e.g., software or firmware) executed by a processor, or any combination thereof. If implemented in code executed by a processor, the functions of the communication manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 415, or its sub-components, may be physically located at various positions, including being distributed such that portions of functions are implemented at different physical locations by one or more physical components. In some examples, the communication manager 415, or its sub-components, may be a separate and distinct component in accordance with various aspects of the present disclosure. In some examples, the communication manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 715 described with reference to FIG. 7. The transmitter 420 may utilize a single antenna or a set of antennas.

Figure 5:
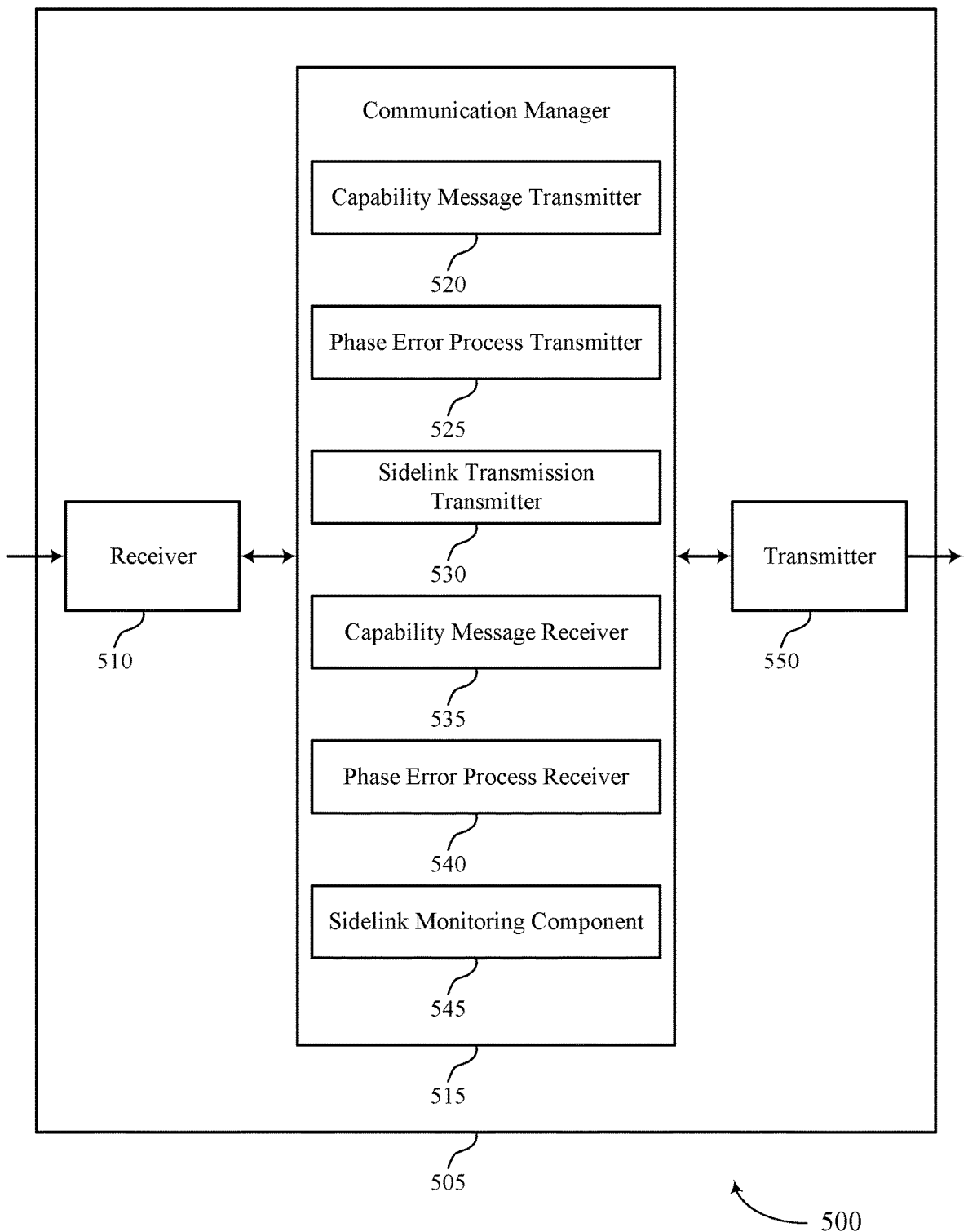

FIG. 5 shows a block diagram 500 of a device 505 that supports sidelink tracking considerations with multi-panel operation in accordance with aspects of the present disclosure. The device 505 may be an example of aspects of a device 405, or a UE 115 as described herein. The device 505 may include a receiver 510, a communication manager 515, and a transmitter 550. The device 505 may also include a processor. Each of these components may be in communication with one another (e.g., via one or more buses).

The receiver 510 may receive information such as packets, user data, or control information associated with various information channels (e.g., control channels, data channels, and information related to sidelink tracking considerations with multi-panel operation, etc.). Information may be passed on to other components of the device 505. The receiver 510 may be an example of aspects of the transceiver 715 described with reference to FIG. 7. The receiver 510 may utilize a single antenna or a set of antennas.

The communication manager 515 may be an example of aspects of the communication manager 415 as described herein. The communication manager 515 may include a capability message transmitter 520, a phase error process transmitter 525, a sidelink transmission transmitter 530, a capability message receiver 535, a phase error process receiver 540, and a sidelink monitoring component 545. The communication manager 515 may be an example of aspects of the communication manager 710 described herein.

The capability message transmitter 520 may transmit a capability message indicating a parameter configuration for each phase error process of a set of phase error processes of the first UE.

The phase error process transmitter 525 may transmit a phase error process indicator to indicate that the first UE is using a first phase error process of the set of phase error processes to generate a sidelink transmission in accordance with the parameter configuration for the first phase error process.

The sidelink transmission transmitter 530 may transmit, via a sidelink channel, the sidelink transmission to a second UE.

The capability message receiver 535 may receive a capability message indicating a parameter configuration for each phase error process of a set of phase error processes of a second UE.

The phase error process receiver 540 may receive a phase error process indicator to indicate that the second UE is using a first phase error process of the set of phase error processes to generate a sidelink transmission in accordance with the parameter configuration for the first phase error process.

The sidelink monitoring component 545 may monitor, via a sidelink channel, for the sidelink transmission based on frequency tracking, phase tracking, time tracking, or any combination thereof, being performed in accordance with the parameter configuration for the first phase error process.

The transmitter 550 may transmit signals generated by other components of the device 505. In some examples, the transmitter 550 may be collocated with a receiver 510 in a transceiver module. For example, the transmitter 550 may be an example of aspects of the transceiver 715 described with reference to FIG. 7. The transmitter 550 may utilize a single antenna or a set of antennas.

Figure 6:
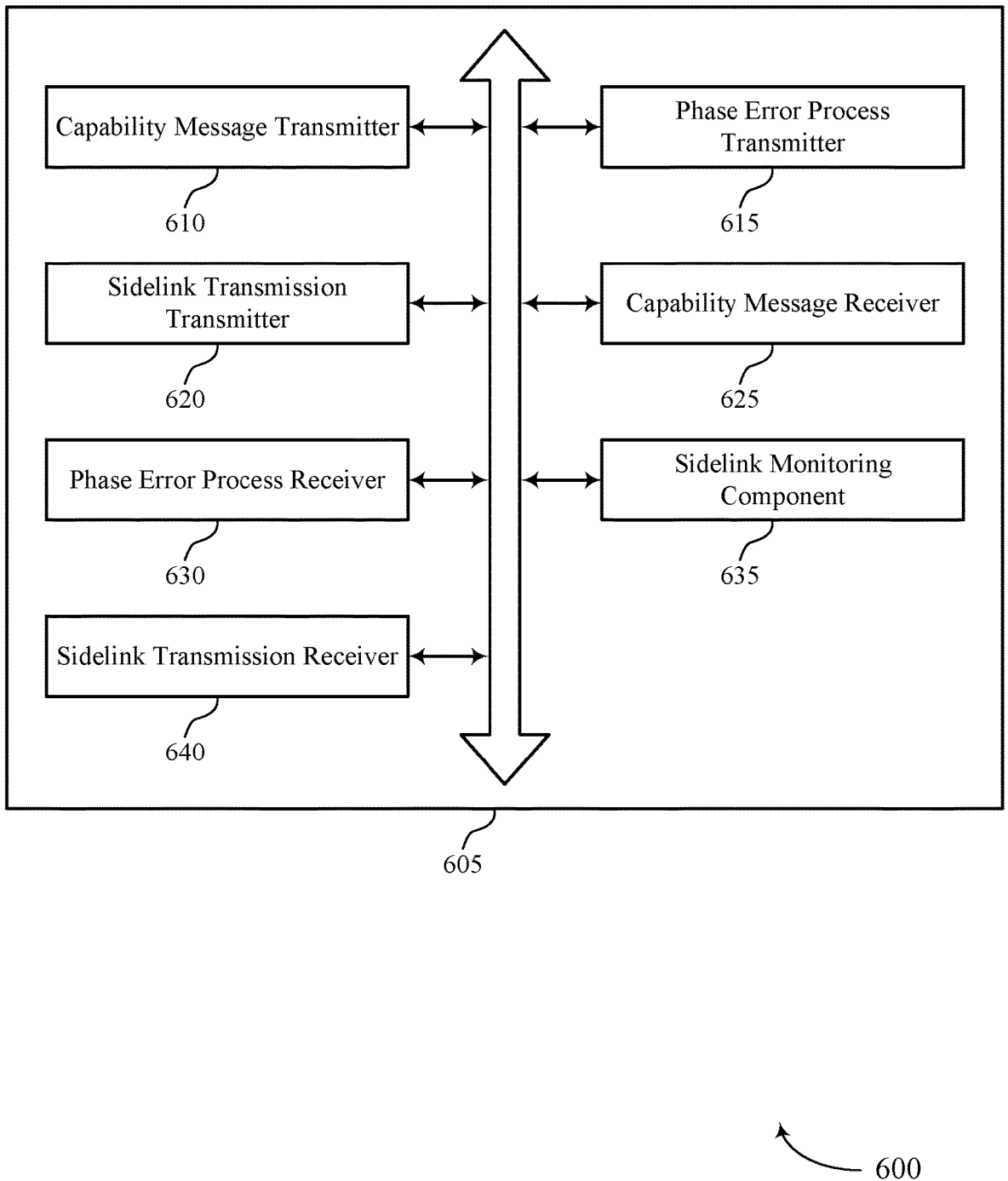
FIG. 6 shows a block diagram of a communication manager that supports sidelink tracking considerations with multi-panel operation in accordance with aspects of the present disclosure.

FIG. 6 shows a block diagram 600 of a communication manager 605 that supports sidelink tracking considerations with multi-panel operation in accordance with aspects of the present disclosure. The communication manager 605 may be an example of aspects of a communication manager 415, a communication manager 515, or a communication manager 710 described herein. The communication manager 605 may include a capability message transmitter 610, a phase error process transmitter 615, a sidelink transmission transmitter 620, a capability message receiver 625, a phase error process receiver 630, a sidelink monitoring component 635, and a sidelink transmission receiver 640. Each of these modules may communicate, directly or indirectly, with one another (e.g., via one or more buses).

The capability message transmitter 610 may transmit a capability message indicating a parameter configuration for each phase error process of a set of phase error processes of the first UE. In some examples, the capability message transmitter 610 may transmit the capability message indicating the parameter configuration for the first phase error process that indicates a sidelink frequency offset parameter, a sidelink timing error parameter, a sidelink phase noise process parameter, a sidelink phase noise characteristic, or any combination thereof. In some examples, the capability message transmitter 610 may transmit the capability message to the second UE via the sidelink channel. In some examples, the capability message transmitter 610 may transmit the capability message to a base station or a sidelink coordination function. In some examples, the sidelink coordination function may be a proximity services function.

In some examples, the capability message transmitter 610 may transmit the capability message indicating the parameter configuration for the first phase error process that indicates a transmission time interval in which the first phase error process applies. In some examples, the capability message transmitter 610 may transmit the capability message indicating the parameter configuration for the first phase error process that indicates the sidelink transmission is a reference signal transmission. The reference signal transmission may correspond to a sidelink synchronization signal block, a physical sidelink control channel, a physical sidelink data channel, a sidelink channel state information reference signal, a sidelink sounding reference signal, a synchronization signal block, a physical downlink control channel, physical downlink shared data channel, a physical uplink control channel, physical uplink data channel, or any combination thereof. In some examples, the capability message transmitter 610 may transmit the capability message indicating the parameter configuration for the first phase error process that indicates one or more panels of the first UE for which the first phase error process is in use. In some examples, the capability message transmitter 610 may transmit the capability message indicating the parameter configuration for the first phase error process that indicates one or more transmission reception points, panels, or both, for which the first phase error process is in use.

In some examples, the capability message transmitter 610 may transmit the capability message indicating the parameter configuration for the first phase error process that indicates a quasi co-location relationship with respect to doppler shift, phase noise, timing offset, or any combination thereof, between the first phase error process and a second phase error process of the set of phase error processes. In some examples, the capability message transmitter 610 may transmit the capability message indicating the parameter configuration for the first phase error process that indicates a location of one or more panels of the first UE for which the first phase error process is in use. In some examples, the capability message transmitter 610 may transmit the capability message indicating the parameter configuration for the first phase error process that indicates a capability of the first UE, when the first phase error process is in use, to simultaneously transmit and receive from one or more wireless devices. In some cases, the sidelink coordination function includes a proximity services function.

The phase error process transmitter 615 may transmit a phase error process indicator to indicate that the first UE is using a first phase error process of the set of phase error processes to generate a sidelink transmission in accordance with the parameter configuration for the first phase error process. In some examples, the phase error process transmitter 615 may transmit the phase error process indicator indicating a transmission time interval in which the first phase error process applies. In some examples, the phase error process transmitter 615 may transmit the phase error process indicator indicating the sidelink transmission is a reference signal transmission. In some examples, the reference signal transmission may correspond to a sidelink synchronization signal block, a physical sidelink control channel, a physical sidelink data channel, a sidelink channel state information reference signal, a sidelink sounding reference signal, a synchronization signal block, a physical uplink control channel, physical uplink data channel, or any combination thereof. In some examples, the phase error process transmitter 615 may transmit the phase error process indicator indicating one or more panels of the first UE for which the first phase error process is in use.

In some examples, the phase error process transmitter 615 may transmit the phase error process indicator indicating one or more transmission reception points, panels, or both for which the first phase error process is in use. In some examples, the phase error process transmitter 615 may transmit the phase error process indicator indicating a quasi co-location relationship with respect to doppler shift, phase noise, timing offset, or any combination thereof, between the first phase error process and a second phase error process of the set of phase error processes. In some examples, the phase error process transmitter 615 may transmit the phase error process indicator indicating a location of one or more panels of the first UE for which the first phase error process is in use. In some examples, the phase error process transmitter 615 may transmit the phase error process indicator indicating a capability of the first UE, when the first phase error process is in use, to simultaneously transmit and receive from one or more wireless devices.

The sidelink transmission transmitter 620 may transmit, via a sidelink channel, the sidelink transmission to a second UE.

The capability message receiver 625 may receive a capability message indicating a parameter configuration for each phase error process of a set of phase error processes of a second UE. In some examples, the capability message receiver 625 may receive the capability message indicating the parameter configuration for the first phase error process that indicates a sidelink frequency offset parameter, a sidelink timing error parameter, a sidelink phase noise process parameter, a sidelink phase noise characteristic, or any combination thereof. In some examples, the capability message receiver 625 may receive the capability message from the second UE via the sidelink channel. In some examples, the capability message receiver 625 may receive the capability message from a base station or a sidelink coordination function. In some examples, the sidelink coordination function may be proximity services function. In some examples, the capability message may indicate that the first UE is capable of transmitting one or more signals associated with the set of phase error processes. In some examples, the capability message may be a radio resource control message, a MAC-CE message, sidelink control information, a sidelink control channel message, a sidelink shared channel message, an uplink control channel message, an uplink shared channel message, or any combination thereof.

In some examples, the capability message receiver 625 may receive the capability message indicating the parameter configuration for the first phase error process that indicates a transmission time interval in which the first phase error process applies. In some examples, the capability message receiver 625 may receive the capability message indicating the parameter configuration for the first phase error process that indicates that the sidelink transmission is a reference signal transmission. In some examples, the reference signal transmission may correspond to a sidelink synchronization signal block, a physical sidelink control channel, a physical sidelink data channel, a sidelink channel state information reference signal, a sidelink sounding reference signal, a synchronization signal block, a physical uplink control channel, a physical uplink data channel, or any combination thereof.

In some examples, the capability message receiver 625 may receive the capability message indicating the parameter configuration for the first phase error process that indicates one or more panels of the second UE for which the first phase error process is in use. In some examples, the capability message receiver 625 may receive the capability message indicating the parameter configuration for the first phase error process that indicates one or more transmission reception points, panels, or both for which the first phase error process is in use.

In some examples, the capability message receiver 625 may receive the capability message indicating the parameter configuration for the first phase error process that indicates a quasi co-location relationship with respect to doppler shift, phase offset, timing offset, or any combination thereof, between the first phase error process and a second phase error process of the set of phase error processes. In some examples, the capability message receiver 625 may receive the capability message indicating the parameter configuration for the first phase error process that indicates a location of one or more panels of the second UE for which the first phase error process is in use. In some examples, the capability message receiver 625 may receive the capability message indicating the parameter configuration for the first phase error process that indicates a capability of the second UE, when the first phase error process is in use, to simultaneously transmit and receive from one or more wireless devices. In some cases, the sidelink coordination function includes a proximity services function.

The phase error process receiver 630 may receive a phase error process indicator to indicate that the second UE is using a first phase error process of the set of phase error processes to generate a sidelink transmission in accordance with the parameter configuration for the first phase error process. In some examples, the phase error process receiver 630 may receive the phase error process indicator indicating a transmission time interval in which the first phase error process applies. In some examples, the phase error process receiver 630 may receive the phase error process indicator indicating the sidelink transmission is a reference signal transmission. In some examples, the reference signal transmission may correspond to a sidelink synchronization signal block, a physical sidelink control channel, a physical sidelink data channel, a sidelink channel state information reference signal, a sidelink sounding reference signal, a synchronization signal block, a physical uplink control channel, a physical uplink data channel, or any combination thereof. In some examples, the phase error process receiver 630 may receive the phase error process indicator indicating one or more panels of the first UE for which the first phase error process is in use.

In some examples, the phase error process receiver 630 may receive the phase error process indicator indicating one or more transmission reception points, panels, or both for which the first phase error process is in use. In some examples, the phase error process receiver 630 may receive the phase error process indicator indicating a quasi co-location relationship with respect to doppler shift, phase noise, timing offset, or any combination thereof, between the first phase error process and a second phase error process of the set of phase error processes. In some examples, the phase error process receiver 630 may receive the phase error process indicator indicating a location of one or more panels of the first UE for which the first phase error process is in use. In some examples, the phase error process receiver 630 may receive the phase error process indicating a capability of the first UE, when the first phase error process is in use, to simultaneously transmit and receive from one or more wireless devices.

The sidelink monitoring component 635 may monitor, via a sidelink channel, for the sidelink transmission based on frequency tracking, phase tracking, time tracking, or any combination thereof, being performed in accordance with the parameter configuration for the first phase error process. In some examples, the sidelink monitoring component 635 may monitor for a second sidelink transmission based on frequency tracking, phase tracking, time tracking, or any combination thereof, being performed in accordance with the quasi co-location relationship.

The sidelink transmission receiver 640 may receive the sidelink transmission based on of the monitoring.

Figure 7:
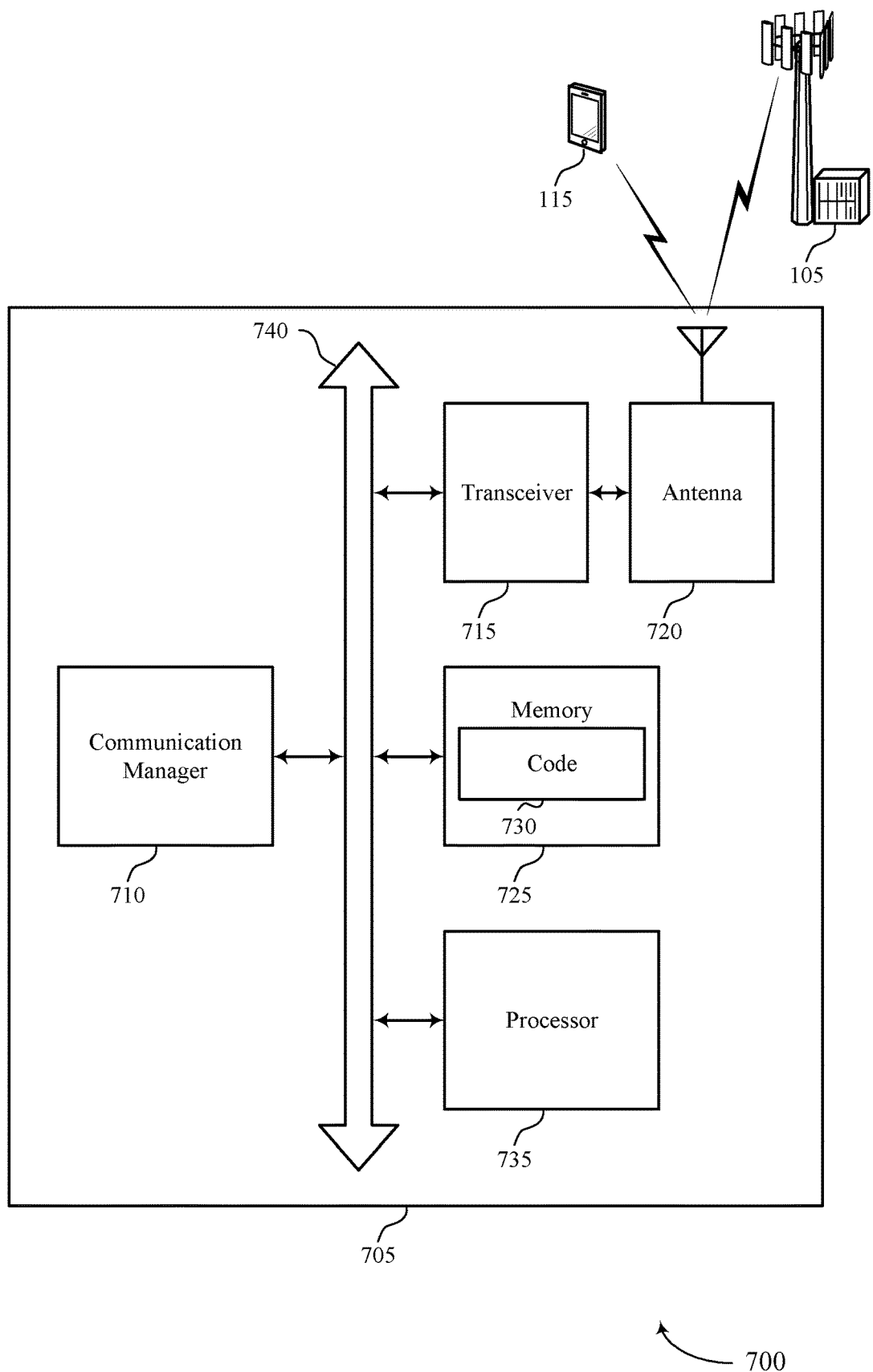
FIG. 7 shows a diagram of a system including a device that supports sidelink tracking considerations with multi-panel operation in accordance with aspects of the present disclosure.

FIG. 7 shows a diagram of a system 700 including a device 705 that supports sidelink tracking considerations with multi-panel operation in accordance with aspects of the present disclosure. The device 705 may be an example of or include the components of device 405, device 505, or a UE 115 as described herein. The device 705 may include components for bi-directional voice and data communications including components for transmitting and receiving communications, including a communication manager 710, a transceiver 715, an antenna 720, memory 725, and a processor 735. These components may be in electronic communication via one or more buses (e.g., bus 740).

The communication manager 710 may transmit a capability message indicating a parameter configuration for each phase error process of a set of phase error processes of the first UE, transmit a phase error process indicator to indicate that the first UE is using a first phase error process of the set of phase error processes to generate a sidelink transmission in accordance with the parameter configuration for the first phase error process, and transmit, via a sidelink channel, the sidelink transmission to a second UE. The communication manager 710 may also receive a capability message indicating a parameter configuration for each phase error process of a set of phase error processes of a second UE, receive a phase error process indicator to indicate that the second UE is using a first phase error process of the set of phase error processes to generate a sidelink transmission in accordance with the parameter configuration for the first phase error process, and monitor, via a sidelink channel, for the sidelink transmission based on frequency tracking, phase tracking, time tracking, or any combination thereof, being performed in accordance with the parameter configuration for the first phase error process.

In some examples, the communication manager 710 monitoring the sidelink transmission based on frequency tracking, phase tracking, time tracking, or any combination thereof, being performed in accordance with a received parameter configuration for a first phase error process may have one or more advantages. For instance, receiving the parameter configuration may enable the communication manager 710 to account for frequency drift, phase noise, or timing errors at a transmitting device when one or each of these quantities are non-zero. By accounting for one or each of these quantities according to the received parameter configuration, the communication manager 710 may be able to more accurately receive transmissions from the transmitting device.

The transceiver 715 may communicate bi-directionally, via one or more antennas, wired, or wireless links as described above. For example, the transceiver 715 may represent a wireless transceiver and may communicate bi-directionally with another wireless transceiver.

The transceiver 715 may also include a modem to modulate the packets and provide the modulated packets to the antennas for transmission, and to demodulate packets received from the antennas.

In some cases, the wireless device may include a single antenna 720. However, in some cases the device may have more than one antenna 720, which may be capable of concurrently transmitting or receiving multiple wireless transmissions.

The memory 725 may include random-access memory (RAM) and read-only memory (ROM). The memory 725 may store computer-readable, computer-executable code 730 including instructions that, when executed, cause the processor to perform various functions described herein. In some cases, the memory 725 may contain, among other things, a basic input/output system (BIOS) which may control basic hardware or software operation such as the interaction with peripheral components or devices.

The code 730 may include instructions to implement aspects of the present disclosure, including instructions to support wireless communications. The code 730 may be stored in a non-transitory computer-readable medium such as system memory or other type of memory. In some cases, the code 730 may not be directly executable by the processor 735 but may cause a computer (e.g., when compiled and executed) to perform functions described herein.

The processor 735 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 735 may be configured to operate a memory array using a memory controller. In other cases, a memory controller may be integrated into the processor 735. The processor 735 may be configured to execute computer-readable instructions stored in a memory (e.g., the memory 725) to cause the device 705 to perform various functions (e.g., functions or tasks supporting sidelink tracking considerations with multi-panel operation).

Figure 8:
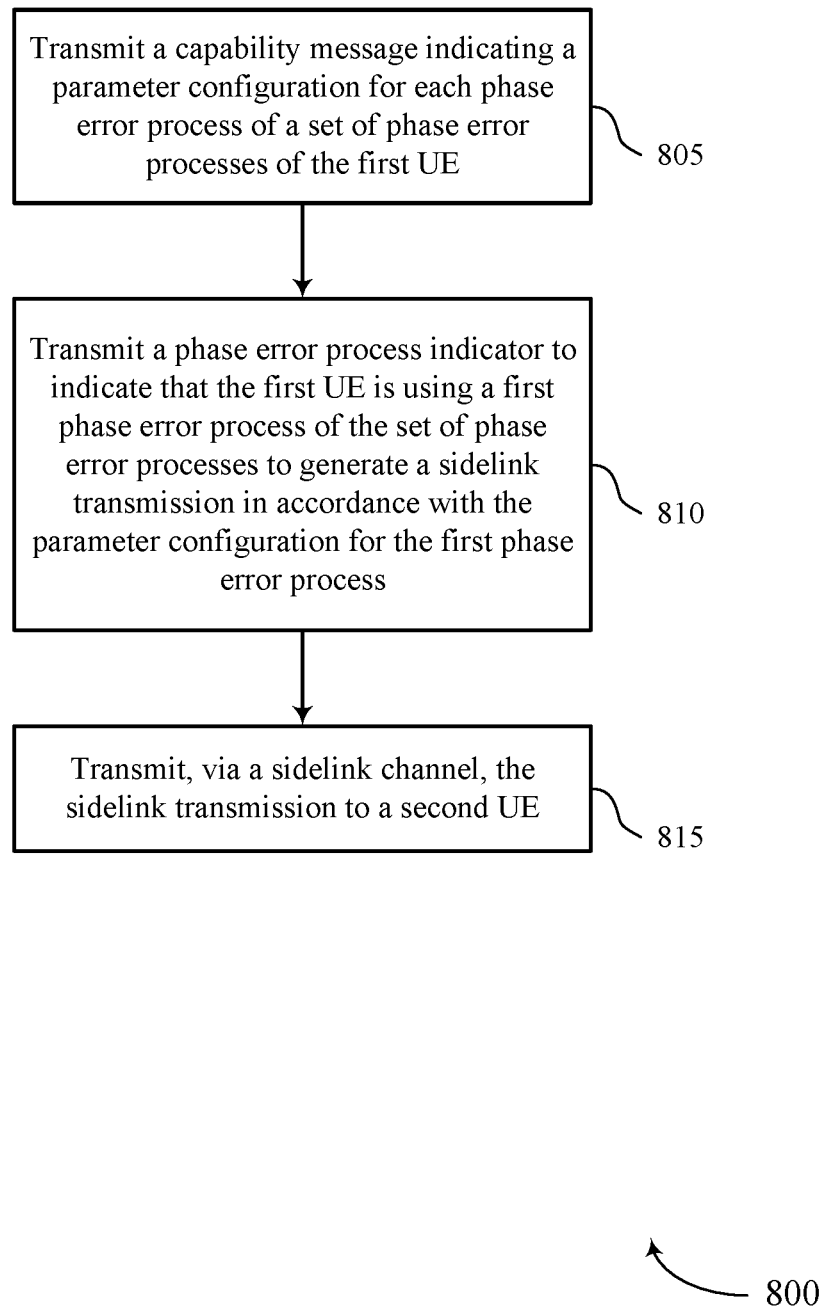
FIGS. 8 through 12 show flowcharts illustrating methods that support sidelink tracking considerations with multi-panel operation in accordance with aspects of the present disclosure.

FIG. 8 shows a flowchart illustrating a method 800 that supports sidelink tracking considerations with multi-panel operation in accordance with aspects of the present disclosure. The operations of method 800 may be implemented by a UE 115 or its components as described herein. For example, the operations of method 800 may be performed by a communication manager as described with reference to FIGS. 4 through 7. In some examples, a UE may execute a set of instructions to control the functional elements of the UE to perform the described functions. Additionally or alternatively, a UE may perform aspects of the described functions using special-purpose hardware.

At 805, the UE may transmit a capability message indicating a parameter configuration for each phase error process of a set of phase error processes of the first UE. The operations of 805 may be performed according to the methods described herein. In some examples, aspects of the operations of 805 may be performed by a capability message transmitter as described with reference to FIGS. 4 through 7.

At 810, the UE may transmit a phase error process indicator to indicate that the first UE is using a first phase error process of the set of phase error processes to generate a sidelink transmission in accordance with the parameter configuration for the first phase error process. The operations of 810 may be performed according to the methods described herein. In some examples, aspects of the operations of 810 may be performed by a phase error process transmitter as described with reference to FIGS. 4 through 7.

At 815, the UE may transmit, via a sidelink channel, the sidelink transmission to a second UE. The operations of 815 may be performed according to the methods described herein. In some examples, aspects of the operations of 815 may be performed by a sidelink transmission transmitter as described with reference to FIGS. 4 through 7.

Figure 9:
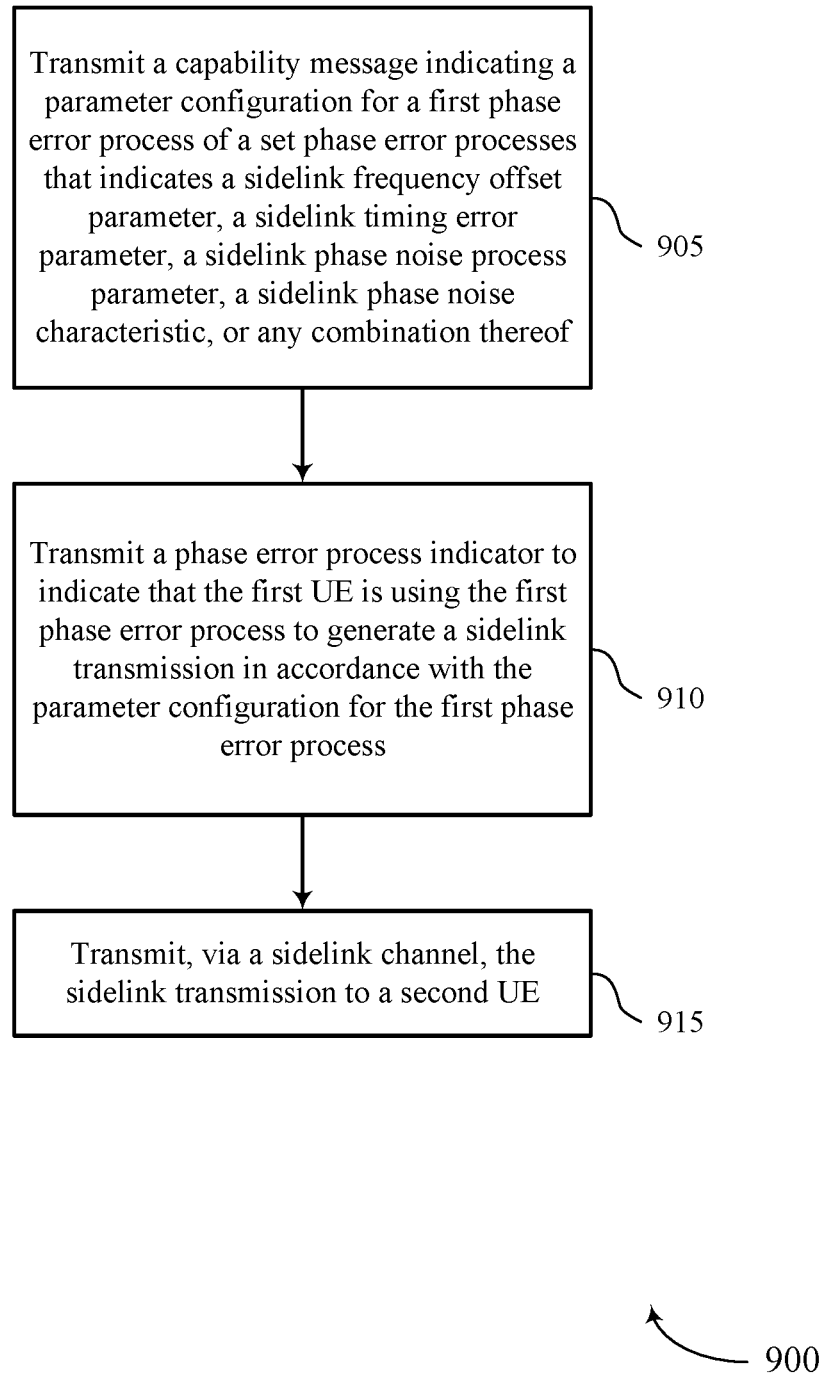

FIG. 9 shows a flowchart illustrating a method 900 that supports sidelink tracking considerations with multi-panel operation in accordance with aspects of the present disclosure. The operations of method 900 may be implemented by a UE 115 or its components as described herein. For example, the operations of method 900 may be performed by a communication manager as described with reference to FIGS. 4 through 7. In some examples, a UE may execute a set of instructions to control the functional elements of the UE to perform the described functions. Additionally or alternatively, a UE may perform aspects of the described functions using special-purpose hardware.

At 905, the UE may transmit a capability message indicating a parameter configuration for a first phase error process of a set phase error processes that indicates a sidelink frequency offset parameter, a sidelink timing error parameter, a sidelink phase noise process parameter, a sidelink phase noise characteristic, or any combination thereof. The operations of 905 may be performed according to the methods described herein. In some examples, aspects of the operations of 905 may be performed by a capability message transmitter as described with reference to FIGS. 4 through 7.

At 910, the UE may transmit a phase error process indicator to indicate that the first UE is using the first phase error process to generate a sidelink transmission in accordance with the parameter configuration for the first phase error process. The operations of 910 may be performed according to the methods described herein. In some examples, aspects of the operations of 910 may be performed by a phase error process transmitter as described with reference to FIGS. 4 through 7.

At 915, the UE may transmit, via a sidelink channel, the sidelink transmission to a second UE. The operations of 915 may be performed according to the methods described herein. In some examples, aspects of the operations of 915 may be performed by a sidelink transmission transmitter as described with reference to FIGS. 4 through 7.

Figure 10:
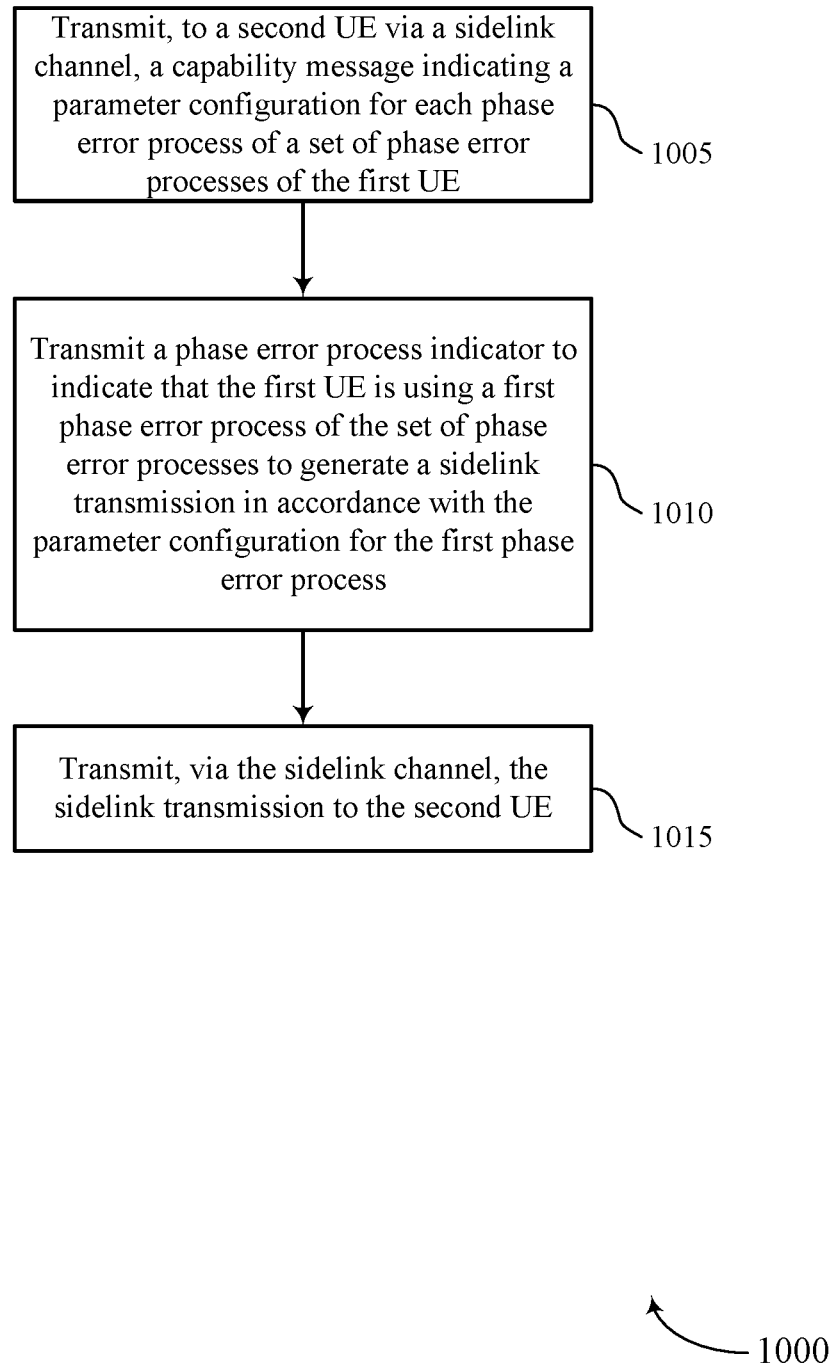

FIG. 10 shows a flowchart illustrating a method 1000 that supports sidelink tracking considerations with multi-panel operation in accordance with aspects of the present disclosure. The operations of method 1000 may be implemented by a UE 115 or its components as described herein. For example, the operations of method 1000 may be performed by a communication manager as described with reference to FIGS. 4 through 7. In some examples, a UE may execute a set of instructions to control the functional elements of the UE to perform the described functions. Additionally or alternatively, a UE may perform aspects of the described functions using special-purpose hardware.

At 1005, the UE may transmit, to a second UE via a sidelink channel, a capability message indicating a parameter configuration for each phase error process of a set of phase error processes of the first UE. The operations of 1005 may be performed according to the methods described herein. In some examples, aspects of the operations of 1005 may be performed by a capability message transmitter as described with reference to FIGS. 4 through 7.

At 1010, the UE may transmit a phase error process indicator to indicate that the first UE is using a first phase error process of the set of phase error processes to generate a sidelink transmission in accordance with the parameter configuration for the first phase error process. The operations of 1010 may be performed according to the methods described herein. In some examples, aspects of the operations of 1010 may be performed by a phase error process transmitter as described with reference to FIGS. 4 through 7.

At 1015, the UE may transmit, via the sidelink channel, the sidelink transmission to the second UE. The operations of 1015 may be performed according to the methods described herein. In some examples, aspects of the operations of 1015 may be performed by a sidelink transmission transmitter as described with reference to FIGS. 4 through 7.

Figure 11:
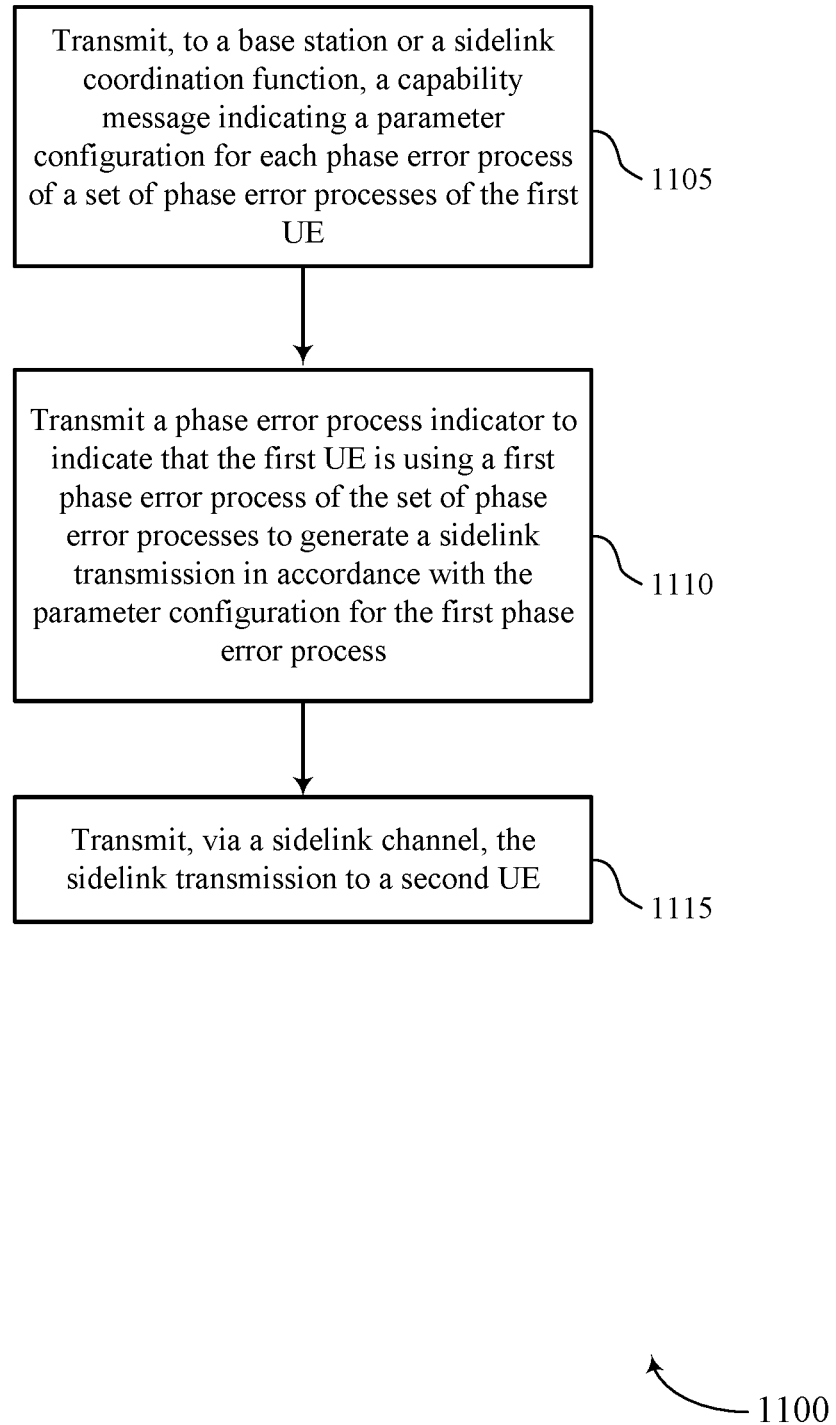

FIG. 11 shows a flowchart illustrating a method 1100 that supports sidelink tracking considerations with multi-panel operation in accordance with aspects of the present disclosure. The operations of method 1100 may be implemented by a UE 115 or its components as described herein. For example, the operations of method 1100 may be performed by a communication manager as described with reference to FIGS. 4 through 7. In some examples, a UE may execute a set of instructions to control the functional elements of the UE to perform the described functions. Additionally or alternatively, a UE may perform aspects of the described functions using special-purpose hardware.

At 1105, the UE may transmit, to a base station or a sidelink coordination function, a capability message indicating a parameter configuration for each phase error process of a set of phase error processes of the first UE. The operations of 1105 may be performed according to the methods described herein. In some examples, aspects of the operations of 1105 may be performed by a capability message transmitter as described with reference to FIGS. 4 through 7.

At 1110, the UE may transmit a phase error process indicator to indicate that the first UE is using a first phase error process of the set of phase error processes to generate a sidelink transmission in accordance with the parameter configuration for the first phase error process. The operations of 1110 may be performed according to the methods described herein. In some examples, aspects of the operations of 1110 may be performed by a phase error process transmitter as described with reference to FIGS. 4 through 7.

At 1115, the UE may transmit, via a sidelink channel, the sidelink transmission to a second UE. The operations of 1115 may be performed according to the methods described herein. In some examples, aspects of the operations of 1115 may be performed by a sidelink transmission transmitter as described with reference to FIGS. 4 through 7.

Figure 12:
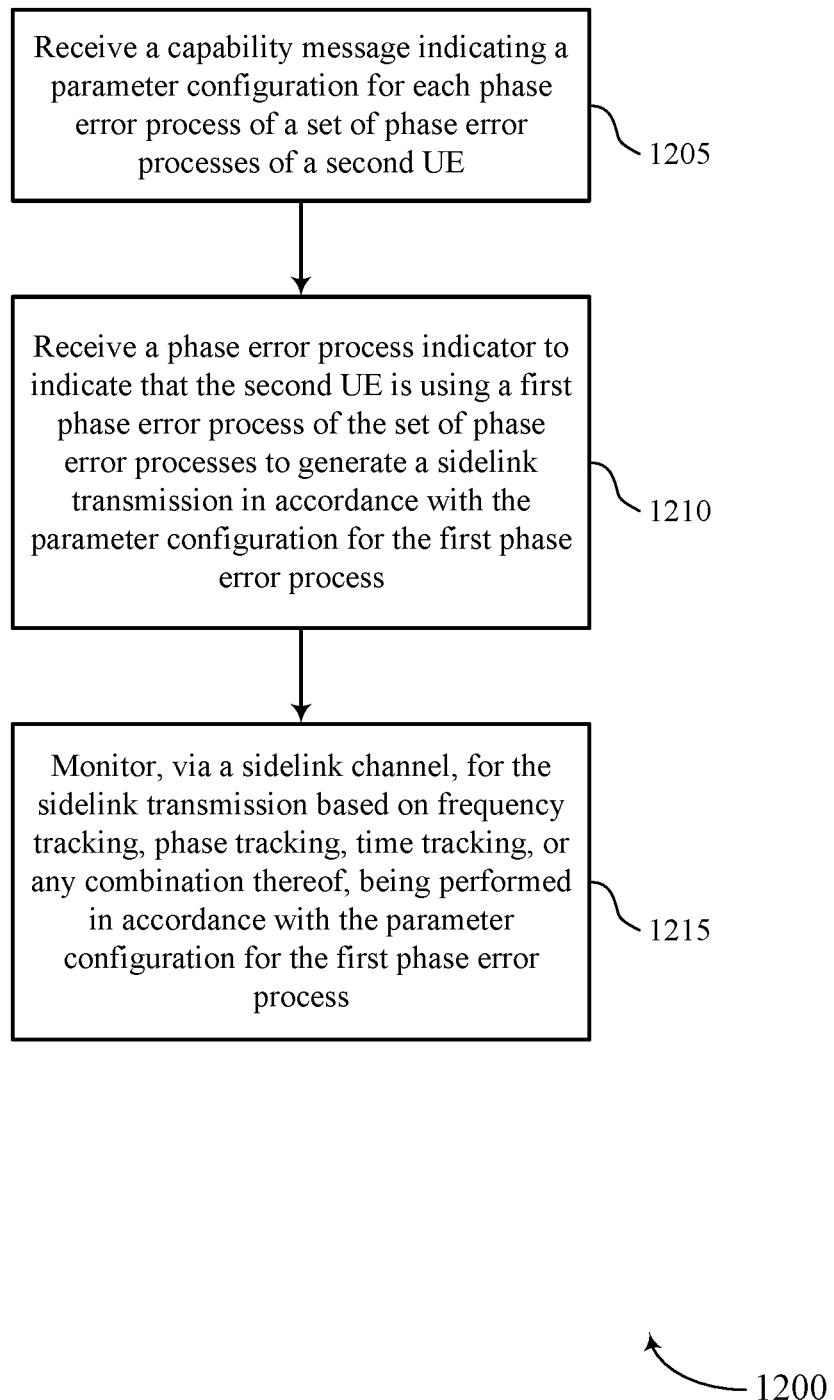

FIG. 12 shows a flowchart illustrating a method 1200 that supports sidelink tracking considerations with multi-panel operation in accordance with aspects of the present disclosure. The operations of method 1200 may be implemented by a UE 115 or its components as described herein. For example, the operations of method 1200 may be performed by a communication manager as described with reference to FIGS. 4 through 7. In some examples, a UE may execute a set of instructions to control the functional elements of the UE to perform the described functions. Additionally or alternatively, a UE may perform aspects of the described functions using special-purpose hardware.

At 1205, the UE may receive a capability message indicating a parameter configuration for each phase error process of a set of phase error processes of a second UE. The operations of 1205 may be performed according to the methods described herein. In some examples, aspects of the operations of 1205 may be performed by a capability message receiver as described with reference to FIGS. 4 through 7.

At 1210, the UE may receive a phase error process indicator to indicate that the second UE is using a first phase error process of the set of phase error processes to generate a sidelink transmission in accordance with the parameter configuration for the first phase error process. The operations of 1210 may be performed according to the methods described herein. In some examples, aspects of the operations of 1210 may be performed by a phase error process receiver as described with reference to FIGS. 4 through 7.

At 1215, the UE may monitor, via a sidelink channel, for the sidelink transmission based on frequency tracking, phase tracking, time tracking, or any combination thereof, being performed in accordance with the parameter configuration for the first phase error process. The operations of 1215 may be performed according to the methods described herein. In some examples, aspects of the operations of 1215 may be performed by a sidelink monitoring component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Aspect 1: A method for wireless communications by a first UE, comprising: transmitting a capability message indicating a parameter configuration for each phase error process of a plurality of phase error processes of the first UE; transmitting a phase error process indicator to indicate that the first UE is using a first phase error process of the plurality of phase error processes to generate a sidelink transmission in accordance with the parameter configuration for the first phase error process; and transmitting, via a sidelink channel, the sidelink transmission to a second UE.

Aspect 2: The method of aspect 1, wherein transmitting the capability message comprises: transmitting the capability message indicating the parameter configuration for the first phase error process that indicates a sidelink frequency offset parameter, a sidelink timing error parameter, a sidelink phase noise process parameter, a sidelink phase noise characteristic, or any combination thereof.

Aspect 3: The method of any of aspects 1 through 2, wherein transmitting the capability message comprises: transmitting the capability message to the second UE via the sidelink channel.

Aspect 4: The method of any of aspects 1 through 3, wherein transmitting the capability message comprises: transmitting the capability message to a base station or a sidelink coordination function.

Aspect 5: The method of aspect 4, wherein the sidelink coordination function comprises a proximity services function.

Aspect 6: The method of any of aspects 1 through 5, wherein transmitting the capability message comprises: transmitting the capability message indicating the parameter configuration for the first phase error process that indicates a transmission time interval in which the first phase error process applies.

Aspect 7: The method of any of aspects 1 through 6, wherein transmitting the capability message comprises: transmitting the capability message indicating the parameter configuration for the first phase error process that indicates the sidelink transmission is a reference signal transmission.

Aspect 8: The method of aspect 7, wherein the reference signal transmission corresponds to a sidelink synchronization signal block, a physical sidelink control channel, a physical sidelink data channel, a sidelink channel state information reference signal, a sidelink sounding reference signal, a synchronization signal block, a physical uplink control channel, a physical uplink data channel, or any combination thereof.

Aspect 9: The method of any of aspects 1 through 8, wherein transmitting the capability message comprises: transmitting the capability message indicating the parameter configuration for the first phase error process that indicates one or more panels of the first UE for which the first phase error process is in use.

Aspect 10: The method of any of aspects 1 through 9, wherein transmitting the capability message comprises: transmitting the capability message indicating the parameter configuration for the first phase error process that indicates one or more transmission reception points, panels, or both, for which the first phase error process is in use.

Aspect 11: The method of any of aspects 1 through 10, wherein transmitting the capability message comprises: transmitting the capability message indicating the parameter configuration for the first phase error process that indicates a quasi co-location relationship with respect to doppler shift, phase noise, timing offset, or any combination thereof, between the first phase error process and a second phase error process of the plurality of phase error processes.

Aspect 12: The method of any of aspects 1 through 11, wherein transmitting the capability message comprises: transmitting the capability message indicating the parameter configuration for the first phase error process that indicates a location of one or more panels of the first UE for which the first phase error process is in use.

Aspect 13: The method of any of aspects 1 through 12, wherein transmitting the capability message comprises: transmitting the capability message indicating the parameter configuration for the first phase error process that indicates a capability of the first UE, when the first phase error process is in use, to simultaneously transmit and receive from one or more wireless devices.

Aspect 14: The method of any of aspects 1 through 13, wherein transmitting the phase error process indicator comprises: transmitting the phase error process indicator indicating a transmission time interval in which the first phase error process applies.

Aspect 15: The method of any of aspects 1 through 14, wherein transmitting the phase error process indicator comprises: transmitting the phase error process indicator indicating the sidelink transmission is a reference signal transmission.

Aspect 16: The method of aspect 15, wherein the reference signal transmission corresponds to a sidelink synchronization signal block, a physical sidelink control channel, a physical sidelink data channel, a sidelink channel state information reference signal, a sidelink sounding reference signal, a synchronization signal block, a physical uplink control channel, a physical uplink data channel, or any combination thereof.

Aspect 17: The method of any of aspects 1 through 16, wherein transmitting the phase error process indicator comprises: transmitting the phase error process indicator indicating one or more panels of the first UE for which the first phase error process is in use.

Aspect 18: The method of any of aspects 1 through 17, wherein transmitting the phase error process indicator comprises: transmitting the phase error process indicator indicating one or more transmission reception points, panels, or both for which the first phase error process is in use.

Aspect 19: The method of any of aspects 1 through 18, wherein transmitting the phase error process indicator comprises: transmitting the phase error process indicator indicating a quasi co-location relationship with respect to doppler shift, phase noise, timing offset, or any combination thereof, between the first phase error process and a second phase error process of the plurality of phase error processes.

Aspect 20: The method of any of aspects 1 through 19, wherein transmitting the phase error process indicator comprises: transmitting the phase error process indicator indicating a location of one or more panels of the first UE for which the first phase error process is in use.

Aspect 21: The method of any of aspects 1 through 20, wherein transmitting the phase error process indicator comprises: transmitting the phase error process indicator indicating a capability of the first UE, when the first phase error process is in use, to simultaneously transmit and receive from one or more wireless devices.

Aspect 22: The method of any of aspects 1 through 21, wherein the capability message indicates that the first UE is capable of transmitting one or more signals associated with the plurality of phase error processes.

Aspect 23: The method of any of aspects 1 through 22, wherein the capability message is a radio resource control message, a medium access control (MAC) control element, sidelink control information, a sidelink control channel message, a sidelink shared channel message, an uplink control channel message, an uplink shared channel message, or any combination thereof.

Aspect 24: The method of any of aspects 1 through 23, wherein each of the plurality of phase error processes corresponds to a respective voltage controlled oscillator of a plurality of voltage controlled oscillators of the first UE.

Aspect 25: A method for wireless communications by a first UE, comprising: receiving a capability message indicating a parameter configuration for each phase error process of a plurality of phase error processes of a second UE; receiving a phase error process indicator to indicate that the second UE is using a first phase error process of the plurality of phase error processes to generate a sidelink transmission in accordance with the parameter configuration for the first phase error process; and monitoring, via a sidelink channel, for the sidelink transmission based at least in part on frequency tracking, phase tracking, time tracking, or any combination thereof, being performed in accordance with the parameter configuration for the first phase error process.

Aspect 26: The method of aspect 25, further comprising: receiving the sidelink transmission based at least in part on of the monitoring.

Aspect 27: The method of any of aspects 25 through 26, wherein receiving the capability message comprises: receiving the capability message indicating the parameter configuration for the first phase error process that indicates a sidelink frequency offset parameter, a sidelink timing error parameter, a sidelink phase noise process parameter, a sidelink phase noise characteristic, or any combination thereof.

Aspect 28: The method of any of aspects 25 through 27, wherein receiving the capability message comprises: receiving the capability message from the second UE via the sidelink channel.

Aspect 29: The method of any of aspects 25 through 28, wherein receiving the capability message comprises: receiving the capability message from a base station or a sidelink coordination function.

Aspect 30: The method of aspect 29, wherein the sidelink coordination function comprises a proximity services function.

Aspect 31: The method of any of aspects 25 through 30, wherein receiving the capability message comprises: receiving the capability message indicating the parameter configuration for the first phase error process that indicates a transmission time interval in which the first phase error process applies.

Aspect 32: The method of any of aspects 25 through 31, wherein receiving the capability message comprises: receiving the capability message indicating the parameter configuration for the first phase error process that indicates that the sidelink transmission is a reference signal transmission.

Aspect 33: The method of aspect 32, wherein the reference signal transmission corresponds to a sidelink synchronization signal block, a physical sidelink control channel, a physical sidelink data channel, a sidelink channel state information reference signal, a sidelink sounding reference signal, a synchronization signal block, a physical uplink control channel, a physical uplink data channel, or any combination thereof.

Aspect 34: The method of any of aspects 25 through 33, wherein receiving the capability message comprises: receiving the capability message indicating the parameter configuration for the first phase error process that indicates one or more panels of the second UE for which the first phase error process is in use.

Aspect 35: The method of any of aspects 25 through 34, wherein receiving the capability message comprises: receiving the capability message indicating the parameter configuration for the first phase error process that indicates one or more transmission reception points, panels, or both for which the first phase error process is in use.

Aspect 36: The method of any of aspects 25 through 35, wherein receiving the capability message comprises: receiving the capability message indicating the parameter configuration for the first phase error process that indicates a quasi co-location relationship with respect to doppler shift, phase offset, timing offset, or any combination thereof, between the first phase error process and a second phase error process of the plurality of phase error processes.

Aspect 37: The method of aspect 36, further comprising: monitoring for a second sidelink transmission based at least in part on frequency tracking, phase tracking, time tracking, or any combination thereof, being performed in accordance with the quasi co-location relationship.

Aspect 38: The method of any of aspects 25 through 37, wherein receiving the capability message comprises: receiving the capability message indicating the parameter configuration for the first phase error process that indicates a location of one or more panels of the second UE for which the first phase error process is in use.

Aspect 39: The method of any of aspects 25 through 38, wherein receiving the capability message comprises: receiving the capability message indicating the parameter configuration for the first phase error process that indicates a capability of the second UE, when the first phase error process is in use, to simultaneously transmit and receive from one or more wireless devices.

Aspect 40: The method of any of aspects 25 through 39, wherein receiving the phase error process indicator comprises: receiving the phase error process indicator indicating a transmission time interval in which the first phase error process applies.

Aspect 41: The method of any of aspects 25 through 40, wherein receiving the phase error process indicator comprises: receiving the phase error process indicator indicating the sidelink transmission is a reference signal transmission.

Aspect 42: The method of aspect 41, wherein the reference signal transmission corresponds to a sidelink synchronization signal block, a physical sidelink control channel, a physical sidelink data channel, a sidelink channel state information reference signal, a sidelink sounding reference signal, a synchronization signal block, a physical uplink control channel, a physical uplink data channel, or any combination thereof.

Aspect 43: The method of any of aspects 25 through 42, wherein receiving the phase error process indicator comprises: receiving the phase error process indicator indicating one or more panels of the first UE for which the first phase error process is in use.

Aspect 44: The method of any of aspects 25 through 43, wherein receiving the phase error process indicator comprises: receiving the phase error process indicator indicating one or more transmission reception points, panels, or both for which the first phase error process is in use.

Aspect 45: The method of any of aspects 25 through 44, wherein receiving the phase error process indicator comprises: receiving the phase error process indicator indicating a quasi co-location relationship with respect to doppler shift, phase noise, timing offset, or any combination thereof, between the first phase error process and a second phase error process of the plurality of phase error processes.

Aspect 46: The method of any of aspects 25 through 45, wherein receiving the phase error process indicator comprises: receiving the phase error process indicator indicating a location of one or more panels of the first UE for which the first phase error process is in use.

Aspect 47: The method of any of aspects 25 through 46, wherein receiving the phase error process indicator comprises: receiving the phase error process indicating a capability of the first UE, when the first phase error process is in use, to simultaneously transmit and receive from one or more wireless devices.

Aspect 48: The method of any of aspects 25 through 47, wherein the capability message indicates that the second UE is capable of transmitting one or more signals associated with the plurality of phase error processes.

Aspect 49: The method of any of aspects 25 through 48, wherein the capability message is a radio resource control message, a medium access control (MAC) control element, sidelink control information, a sidelink control channel message, a sidelink shared channel message, an uplink control channel message, an uplink shared channel message, or any combination thereof.

Aspect 50: The method of any of aspects 25 through 49, wherein each of the plurality of phase error processes corresponds to respective voltage controlled oscillator of a plurality of voltage controlled oscillators of the second UE.

Aspect 51: An apparatus for wireless communications by a first UE, comprising a processor; memory coupled with the processor; and instructions stored in the memory and executable by the processor to cause the apparatus to perform a method of any of aspects 1 through 24.

Aspect 52: An apparatus for wireless communications by a first UE, comprising at least one means for performing a method of any of aspects 1 through 24.

Aspect 53: A non-transitory computer-readable medium storing code for wireless communications by a first UE, the code comprising instructions executable by a processor to perform a method of any of aspects 1 through 24.

Aspect 54: An apparatus for wireless communications by a first UE, comprising a processor; memory coupled with the processor; and instructions stored in the memory and executable by the processor to cause the apparatus to perform a method of any of aspects 25 through 50.

Aspect 55: An apparatus for wireless communications by a first UE, comprising at least one means for performing a method of any of aspects 25 through 50.

Aspect 56: A non-transitory computer-readable medium storing code for wireless communications by a first UE, the code comprising instructions executable by a processor to perform a method of any of aspects 25 through 50.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications by a first user equipment (UE), comprising:
a processor,
memory in electronic communication with the processor, and
instructions stored in the memory and executable by the processor to cause the apparatus to:
transmit a capability message indicating that the first UE is capable of transmitting signals associated with a plurality of phase error processes, wherein the capability message indicates a parameter configuration for each phase error process of the plurality of phase error processes of the first UE, and wherein each phase error process of the plurality of phase error processes is associated with a respective transmission reception point of a plurality of transmission reception points or a respective antenna panel of a plurality of antenna panels;
transmit a phase error process indicator to indicate that the first UE is using a first phase error process of the plurality of phase error processes for communicating with a second UE;
generate a sidelink transmission in accordance with the parameter configuration for the first phase error process; and
transmit, via a sidelink channel, the sidelink transmission to the second UE.

2. The apparatus of claim 1, wherein the instructions to transmit the capability message are executable by the processor to cause the apparatus to:
transmit the capability message indicating the parameter configuration for the first phase error process that indicates a sidelink frequency offset parameter, a sidelink timing error parameter, a sidelink phase noise process parameter, a sidelink phase noise characteristic, or any combination thereof.

3. The apparatus of claim 1, wherein the instructions to transmit the capability message are executable by the processor to cause the apparatus to:
transmit the capability message to the second UE via the sidelink channel.

4. The apparatus of claim 1, wherein the instructions to transmit the capability message are executable by the processor to cause the apparatus to:
transmit the capability message to a base station or a sidelink coordination function.

5. The apparatus of claim 4, wherein the sidelink coordination function comprises a proximity services function.

6. The apparatus of claim 1, wherein the instructions to transmit the capability message are executable by the processor to cause the apparatus to:
transmit the capability message indicating the parameter configuration for the first phase error process that indicates a transmission time interval in which the first phase error process applies.

7. The apparatus of claim 1, wherein the instructions to transmit the capability message are executable by the processor to cause the apparatus to:
transmit the capability message indicating the parameter configuration for the first phase error process that indicates the sidelink transmission is a reference signal transmission.

8. The apparatus of claim 7, wherein the reference signal transmission corresponds to a sidelink synchronization signal block, a physical sidelink control channel, a physical sidelink data channel, a sidelink channel state information reference signal, a sidelink sounding reference signal, a synchronization signal block, a physical uplink control channel, a physical uplink data channel, or any combination thereof.

9. The apparatus of claim 1, wherein the instructions to transmit the capability message are executable by the processor to cause the apparatus to:
  transmit the capability message indicating the parameter configuration for the first phase error process that indicates one or more antenna panels of the plurality of antenna panels of the first UE for which the first phase error process is in use.

10. The apparatus of claim 1, wherein the instructions to transmit the capability message are executable by the processor to cause the apparatus to:
  transmit the capability message indicating the parameter configuration for the first phase error process that indicates one or more transmission reception points of the plurality of transmission reception points, antenna panels of the plurality of antenna panels, or both, for which the first phase error process is in use.

11. The apparatus of claim 1, wherein the instructions to transmit the capability message are executable by the processor to cause the apparatus to:
  transmit the capability message indicating the parameter configuration for the first phase error process that indicates a quasi co-location relationship with respect to doppler shift, phase noise, timing offset, or any combination thereof, between the first phase error process and a second phase error process of the plurality of phase error processes.

12. The apparatus of claim 1, wherein the instructions to transmit the capability message are executable by the processor to cause the apparatus to:
  transmit the capability message indicating the parameter configuration for the first phase error process that indicates a location of one or more antenna panels of the plurality of antenna panels of the first UE for which the first phase error process is in use.

13. The apparatus of claim 1, wherein the instructions to transmit the capability message are executable by the processor to cause the apparatus to:
  transmit the capability message indicating the parameter configuration for the first phase error process that indicates a capability of the first UE, when the first phase error process is in use, to simultaneously transmit and receive from one or more wireless devices.

14. The apparatus of claim 1, wherein the instructions to transmit the phase error process indicator are executable by the processor to cause the apparatus to:
  transmit the phase error process indicator indicating a transmission time interval in which the first phase error process applies.

15. The apparatus of claim 1, wherein the instructions to transmit the phase error process indicator are executable by the processor to cause the apparatus to:
  transmit the phase error process indicator indicating the sidelink transmission is a reference signal transmission.

16. The apparatus of claim 15, wherein the reference signal transmission corresponds to a sidelink synchronization signal block, a physical sidelink control channel, a physical sidelink data channel, a sidelink channel state information reference signal, a sidelink sounding reference signal, a synchronization signal block, a physical uplink control channel, a physical uplink data channel, or any combination thereof.

17. The apparatus of claim 1, wherein the instructions to transmit the phase error process indicator are executable by the processor to cause the apparatus to:
  transmit the phase error process indicator indicating one or more antenna panels of the plurality of antenna panels of the first UE for which the first phase error process is in use.

18. The apparatus of claim 1, wherein the instructions to transmit the phase error process indicator are executable by the processor to cause the apparatus to:
  transmit the phase error process indicator indicating one or more transmission reception points of the plurality of transmission reception points, antenna panels of the plurality of antenna panels, or both for which the first phase error process is in use.

19. The apparatus of claim 1, wherein the instructions to transmit the phase error process indicator are executable by the processor to cause the apparatus to:
  transmit the phase error process indicator indicating a quasi co-location relationship with respect to doppler shift, phase noise, timing offset, or any combination thereof, between the first phase error process and a second phase error process of the plurality of phase error processes.

20. The apparatus of claim 1, wherein the instructions to transmit the phase error process indicator are executable by the processor to cause the apparatus to:
  transmit the phase error process indicator indicating a location of one or more antenna panels of the plurality of antenna panels of the first UE for which the first phase error process is in use.

21. The apparatus of claim 1, wherein the instructions to transmit the phase error process indicator are executable by the processor to cause the apparatus to:
  transmit the phase error process indicator indicating a capability of the first UE, when the first phase error process is in use, to simultaneously transmit and receive from one or more wireless devices.

22. The apparatus of claim 1, wherein the capability message indicates that the first UE is capable of transmitting one or more signals associated with the plurality of phase error processes.

23. The apparatus of claim 1, wherein the capability message is a radio resource control message, a medium access control (MAC) control element, sidelink control information, a sidelink control channel message, a sidelink shared channel message, an uplink control channel message, an uplink shared channel message, or any combination thereof.

24. An apparatus for wireless communications by a first user equipment (UE), comprising:
  a processor,
  memory in electronic communication with the processor, and
  instructions stored in the memory and executable by the processor to cause the apparatus to:
    receive a capability message indicating that a second UE is capable of transmitting signals associated with a plurality of phase error processes, wherein the capability message indicates a parameter configuration for each phase error process of the plurality of phase error processes of the second UE, and wherein each phase error process of the plurality of phase error processes is associated with a respective transmission reception point of a plurality of transmission reception points or a respective antenna panel of a plurality of antenna panels;
    receive a phase error process indicator to indicate that the second UE is using a first phase error process of the plurality of phase error processes for communicating with the first UE for generating a sidelink transmission in accordance with the parameter configuration for the first phase error process; and monitor, via a sidelink channel, for the sidelink transmission based at least in part on frequency tracking, phase tracking, time tracking, or any combination thereof, being performed in accordance with the parameter configuration for the first phase error process.

25. The apparatus of claim 24, wherein the instructions are further executable by the processor to cause the apparatus to:

receive the sidelink transmission based at least in part on of the monitoring.

26. A method for wireless communications by a first user equipment (UE), comprising:

transmitting a capability message indicating that the first UE is capable of transmitting signals associated with a plurality of phase error processes, wherein the capability message indicates a parameter configuration for each phase error process of the plurality of phase error processes of the first UE, and wherein each phase error process of the plurality of phase error processes is associated with a respective transmission reception point of a plurality of transmission reception points or a respective antenna panel of a plurality of antenna panels;

transmitting a phase error process indicator to indicate that the first UE is using a first phase error process of the plurality of phase error processes for communicating with a second UE;

generating a sidelink transmission in accordance with the parameter configuration for the first phase error process; and transmitting, via a sidelink channel, the sidelink transmission to the second UE.

27. The method of claim 26, wherein transmitting the capability message comprises:

transmitting the capability message indicating the parameter configuration for the first phase error process that indicates a sidelink frequency offset parameter, a sidelink timing error parameter, a sidelink phase noise process parameter, a sidelink phase noise characteristic, or any combination thereof.

28. The method of claim 26, wherein transmitting the capability message comprises:

transmitting the capability message to the second UE via the sidelink channel.

29. A method for wireless communications by a first user equipment (UE), comprising:

receiving a capability message indicating that a second UE is capable of transmitting signals associated with a plurality of phase error processes, wherein the capability message indicates a parameter configuration for each phase error process of the plurality of phase error processes of the second UE, and wherein each phase error process of the plurality of phase error processes is associated with a respective transmission reception point of a plurality of transmission reception points or a respective antenna panel of a plurality of antenna panels;

receiving a phase error process indicator to indicate that the second UE is using a first phase error process of the plurality of phase error processes for communicating with the first UE for generating a sidelink transmission in accordance with the parameter configuration for the first phase error process; and monitoring, via a sidelink channel, for the sidelink transmission based at least in part on frequency tracking, phase tracking, time tracking, or any combination thereof, being performed in accordance with the parameter configuration for the first phase error process.

30. The method of claim 29, further comprising:

receiving the sidelink transmission based at least in part on of the monitoring.

* * * * *